(12) United States Patent
Schechter

(10) Patent No.: US 7,464,675 B1
(45) Date of Patent: Dec. 16, 2008

(54) OPERATING AN AIR-HYBRID VEHICLE WITH CAMSHAFT-DRIVEN ENGINE VALVES

(76) Inventor: Michael Moses Schechter, 31110 Country Ridge Cir., Farmington Hills, MI (US) 48331

( * ) Notice: Subject to any disclaimer, the term of this patent is extended or adjusted under 35 U.S.C. 154(b) by 267 days.

(21) Appl. No.: 11/590,549

(22) Filed: Nov. 1, 2006

(51) Int. Cl.
*F01L 1/34* (2006.01)

(52) U.S. Cl. ............... 123/90.15; 123/90.16; 123/90.12; 123/68; 60/698; 180/165

(58) Field of Classification Search ............... 123/90.15, 123/90.16, 90.17, 90.18, 90.12, 90.13, 68, 123/90.27, 90.31; 60/698; 180/165
See application file for complete search history.

(56) References Cited

U.S. PATENT DOCUMENTS

| | | | |
|---|---|---|---|
| 6,223,846 B1 | 5/2001 | Schechter | |
| 6,302,069 B1 | 10/2001 | Moyer | |
| 6,568,186 B2 * | 5/2003 | Zaleski | 60/698 |
| 7,231,998 B1 * | 6/2007 | Schechter | 180/165 |

\* cited by examiner

*Primary Examiner*—Ching Chang

(57) ABSTRACT

An air-hybrid engine operates in two operational modes. It employs uniquely designed camshafts with cam lobe activators, and camshaft phase shifters to operate and control the engine valves. It uses a different cam lobe for operating an engine valve during each of the two operational modes, and it uses camshaft phase shifters to vary the valve event timing and duration. The system exploits non-linearity that exists in relationship between the piston motion and the camshaft rotation. Varying the phase relationship between the camshaft and the engine crankshaft in a pre-determined specific way varies the duration of the engine valve opening in the required way, thus varying the volumes of air received into and discharged from the engine.

22 Claims, 14 Drawing Sheets

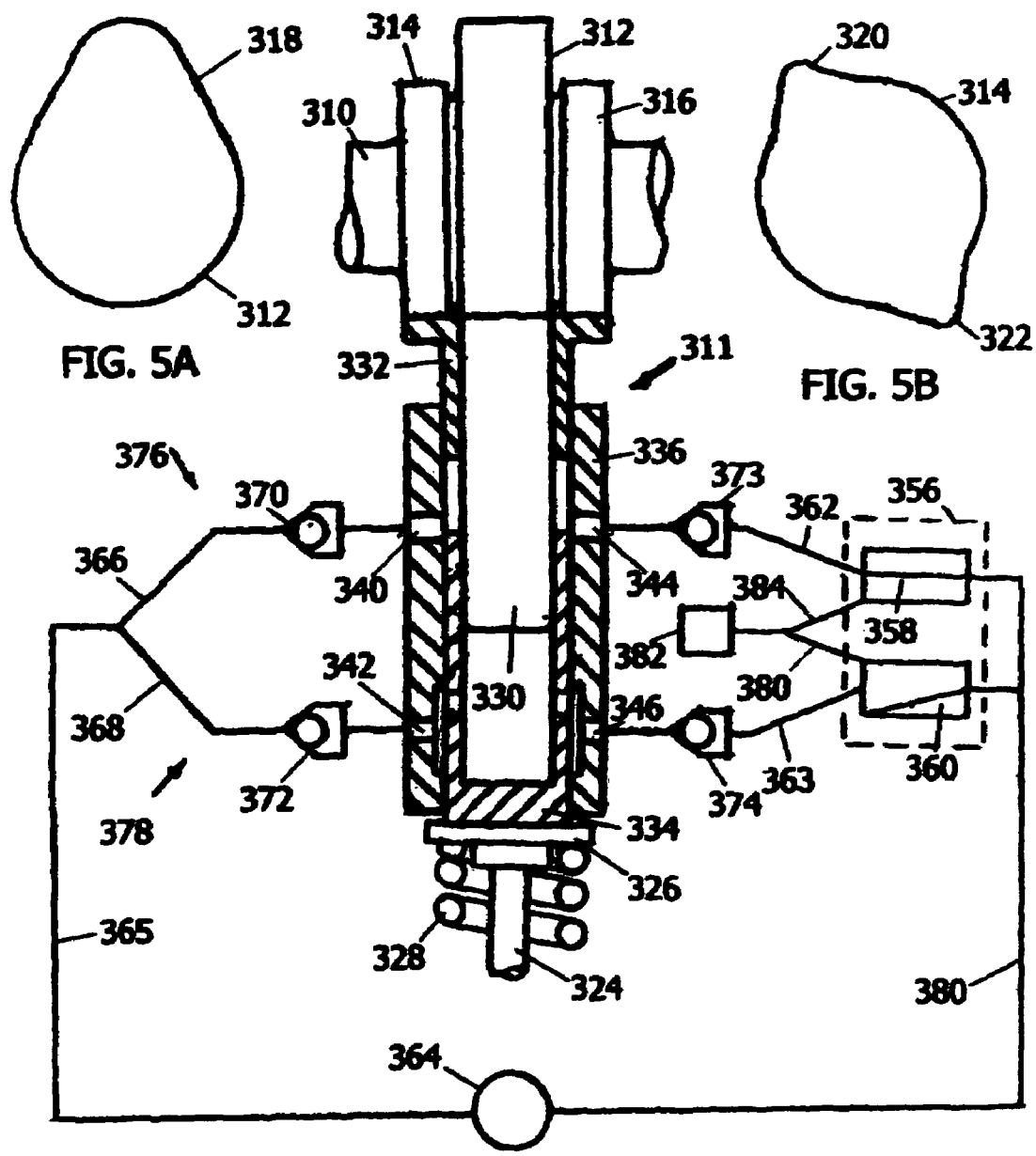
FIG. 5A
FIG. 5B
FIG. 5
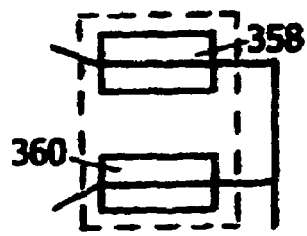
FIG. 5D
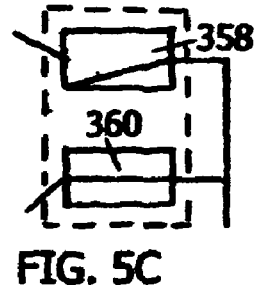
FIG. 5C

OPERATING AN AIR-HYBRID VEHICLE WITH CAMSHAFT-DRIVEN ENGINE VALVES

CROSS-REFERENCE TO RELATED APPLICATIONS

Application Ser. No. 10/822,448. Filing Date: Apr. 9, 2004

FEDERALLY SPONSORED RESEARCH

Not Applicable

SEQUENCE LISTING OR PROGRAM

Not Applicable

FIELD OF THE INVENTION

The present invention relates to vehicle systems capable to accumulate energy derived from vehicle motion during its deceleration or obtained from operation of the vehicle engine, and use the accumulated energy to assist in vehicle acceleration and propulsion at a later time.

BACKGROUND OF THE INVENTION

In most vehicles, their typical driving pattern involves frequent accelerations, each followed by a deceleration. Each acceleration involves a significant increase in fuel consumption needed to produce the additional energy necessary to increase the vehicle speed. Then, during a subsequent deceleration, this added energy is absorbed by vehicle brakes and dissipated as heat. Attempts to overcome such waste of energy led to development of systems in which the energy of vehicle motion is not dissipated during braking, but converted into a form in which it can be temporarily stored and, then, used again to accelerate the vehicle at a later time. An electric hybrid is a typical and currently prevailing example of such system.

An electric hybrid vehicle has two power plants, an internal combustion engine and an electric generator/motor. It also includes an electric battery for energy storage. During braking, the generator/motor absorbs the energy of vehicle motion and deposits it into the battery. During subsequent acceleration, the generator/motor receives energy from the battery and uses it to supplement the work of the internal combustion engine. A disadvantage, common to all types of electric hybrids, is the added cost and complexity associated with the need for the additional electric power plant and associated mechanisms needed to connect it to the vehicle wheels in-parallel to or in-line with the internal combustion engine. Added complexity also increases probability of failures, thus contributing to a reduction in overall system reliability. Another significant disadvantage is the weight of the battery. Electric batteries are excellent energy storage devices, but their weight adds substantially to the mass of the vehicle.

To alleviate the issue of high cost and complexity, a concept of air hybrid was developed. In an air hybrid, there is no need for a second power plant. The internal combustion engine itself absorbs the vehicle braking energy by operating as a compressor, during braking, and deposits the compressed air into an air tank for storage. Then, during acceleration, the energy of compressed air assists the engine in propelling the vehicle. The air-hybrid concept was described in U.S. Pat. No. 6,223,846B1. The above patent describes an air-hybrid engine that employs an electro-hydraulic system to operate and control the engine valves. The engine has no camshafts. Instead, each valve is equipped with a double-acting piston that, when exposed to high-pressure fluid, causes the valve to move. The system includes a set of high-speed solenoid valves that control the timing of the engine valves opening and closing. Two solenoid valves are required for each engine valve—one to control the timing of valve opening, and a second one to control the timing of closing. Varying the timing of the engine valve opening and closing varies the valve opening duration.

The air-hybrid system, described in the above patent, is considerably simpler and less expensive than an electric hybrid. Still, its cost is much higher than the cost of a conventional engine equipped with a camshaft-driven valve train. Most of the cost penalty is associated with the need for a high-pressure hydraulic system and a large number of solenoid valves. In addition, any camless valve train has a potential reliability problem associated with the fact that a failure of a key electronic component, such as a solenoid valve, may cause a piston-to-valve collision. Such collision is likely to result in engine failure. Also, the need to convert the engine mechanical energy into hydraulic energy, to drive the valves, and into electric energy, to drive the solenoid valves, is an inefficient process that is detrimental to the system efficiency.

A conventional engine, equipped with a camshaft-driven valve train, operates its valves without high-pressure hydraulics and without solenoid valves. A camshaft is a relatively low friction device that requires very little of the engine energy for its operation. As long as mechanical integrity of the valve train components is retained, there is no possibility of piston-to-valve collision, because both piston and camshaft are mechanically driven from the engine crankshaft, and the geometry of the cam lobes driving the valves prevents such collision.

In view of the above, it is clear that, to achieve further improvement in air-hybrid cost, efficiency, and reliability, it is highly desirable to have an air-hybrid system using camshafts for engine valve operation. Such a system is the subject of the present invention.

PRIOR ART

The concept of the air-hybrid engine, in which the engine torque and volume of air received into and discharged from the engine can be controlled by varying the duration of the engine valves opening has been proposed before. A U.S. Pat. No. 6,223,846B1 to Schechter describes one such concept. A review of the differences between the present invention and its advantages over the above patent is given below.

(1) The cost of the air-hybrid system described in the present invention is considerably lower than the cost of the system described in the above patent. The above patent describes an air-hybrid engine that employs an electro-hydraulic system to operate and control the engine valves. The engine has no camshafts. Instead, each valve is equipped with a double-acting piston that, when exposed to high-pressure fluid, causes the valve to move. The system includes a set of high-speed solenoid valves that control the timing of the engine valves opening and closing. Two solenoid valves are required for each engine valve—one to control the timing of valve opening, and a second one to control the timing of closing. Varying the timing of the engine valve opening and closing varies the valve opening duration.

One disadvantage of the above electro-hydraulic system is its high cost. A contemporary internal combustion engine has four valves in each cylinder. With two solenoid valves per engine valve, a six-cylinder engine requires at least 24 and possibly as many as 48 solenoid valves, each requiring its own electronic power driver. In addition, a costly high-pressure hydraulic pump and numerous other hydraulic components are added to the engine system. This leads to a substantial increase in the cost of the engine relative to the cost of an engine equipped with a conventional camshaft-driven valve train.

In contrast to the above patent, the present invention describes an air-hybrid engine that employs uniquely designed camshafts and cam lobe activators, and conventional camshaft phase shifters to operate and control the engine valves. The system exploits non-linearity that exists in relationship between the piston motion and the camshaft rotation. Varying the phase relationship between the camshaft and the engine crankshaft in a pre-determined specific way varies the duration of the engine valve opening in the required way, thus varying the volumes of air received into and discharged from the engine. Only two solenoid valves per engine are required, regardless of the number of engine valves and cylinders, and they are low-speed, low-cost solenoids that don't have to be activated every engine cycle. Low-pressure oil, from the conventional engine lubrication system, is used in the system. No high-pressure hydraulic system is required.

Camshafts are very inexpensive, and phase shifters are commercially available and relatively inexpensive devices that are widely used in contemporary engines. The present invention uses inexpensive camshafts and phase shifters instead of a very expensive high-pressure hydraulic system and numerous solenoid valves used in the system described in the above patent. Thanks to this, the air-hybrid system described in the present invention costs much less than the system of the above patent.

(2) The reliability of the air-hybrid system described in the present invention is considerably higher than the reliability of the system described in the above patent. In the system of the above patent, the piston is driven mechanically from the crankshaft, but the valve motion is independent of the crankshaft motion. Because of that, any failure of a key component, such as a solenoid valve or its driver, can lead to a piston-to-valve collision. This would result in a catastrophic engine failure. To prevent engine failure, a continuously operating diagnostic system, which includes sensors monitoring the motion of each valve and deactivates those that deviate from the prescribed pattern of motion, is needed. Introduction of such diagnostic system further increases the costs. It should also be noted that the diagnostic system itself is not immune to failure.

In contrast to that, the system of the present invention employs camshafts to operate the engine valves. Camshafts have been used in internal-combustion engines for more than a century and have a very good reliability record. As long as mechanical integrity of the valve train components is retained, there is no possibility of piston-to-valve collision, because both piston and camshaft are mechanically driven from the engine crankshaft, and the geometry of the cam lobes driving the valves prevents such collision. The design of the phase shifters includes mechanical stops that prevent phase shifting the camshaft beyond the range of safe operation. The task of the two normally-open solenoid valves, which are part of the system, is to select which cam lobes drive the valves, but they do not control the specific pattern of the valve motion. Therefore, a failure of one or both solenoid valves would not lead to piston-to-valve collision. Elimination of possibility of such collision greatly enhances reliability of the system described in the present invention relative to the reliability of the system described in the above patent.

(3) The energy consumption in the system of the present invention is much lower than in the system of the above patent. The system of the above patent uses energy of high-pressure hydraulic fluid to drive the engine valves. Conversion of mechanical energy of the engine into hydraulic energy of the fluid and back into mechanical energy of the moving valves involves substantial energy losses. An additional amount of engine energy must be converted into electrical energy needed to operate the solenoid valves. The system of the present invention involves no such conversions. Mechanical energy of the engine is directly transmitted to the valves via a camshaft, and friction in a properly designed camshaft is very low. Because of that, the system of the present invention is substantially more energy efficient than the system of the above patent.

(4) The system of the above patent is more maintenance-intensive than the system of the present invention. The valve-actuation system of the above patent is a high-complexity system that includes a high-pressure hydraulic system and a large number of frequently-actuated solenoid valves. Such system requires frequent and thorough maintenance during its life span. On the other hand, the system of the present invention is much simpler, since it is only marginally different from a conventional camshaft-based valve train. Therefore the system of the present invention requires less maintenance.

(5) The present invention makes it easier to convert fleets of existing conventional vehicles into air-hybrid-vehicles. The above patent describes an air-hybrid engine with a cylinder head that is substantially different from that in a conventional engine. Because of that, converting an existing vehicle into such air hybrid requires installation of an entirely new engine, which is very costly. On the other hand, the system of the present invention differs from a conventional engine only by what is above the cylinder head, while the cylinder head is no different from a conventional one. This makes the conversion much simpler, easier, and cheaper, since it does not require a new engine. Instead, the existing engine can be converted into an air-hybrid engine by modifying its valve train. Easier and cheaper conversion of large number of existing vehicles into air hybrids, which consume less fuel, can contribute to a substantial reduction in fuel consumption on a national scale.

A U.S. Pat. No. 6,302,069 to Moyer describes a variable valve control system using camshaft for valve operation. For each engine valve, the system includes a cam lobe, two springs, and two solenoids. To initiate opening and closing of the valve, the cam lobe compresses a first spring, while a first solenoid keeps the valve in its closed position. When the first solenoid releases the valve, the first spring drives the valve to its open position and compresses a second spring. A second solenoid holds the valve in its open position. When the second solenoid releases the valve, the second spring drives the valve to its closed position. Varying the timing of the two solenoids activation varies the timing of the valve opening and closing. To operate alternatively in two-stroke and four-stroke operation, the camshaft rotates with crankshaft speed, and the valve is disabled every other camshaft revolution during four-stroke operation.

The method of valve operation described in Moyer's patent is fundamentally different from the method of the present invention. The most important differences are listed below.

(1) In the present invention, the valve is driven by a cam lobe, and its motion is determined by the shape of that cam lobe. In the above patent, a cam lobe serves only to deliver a charge of potential energy to a spring, and its shape does not affect the valve motion.

(2) In the present invention, the timing of the valve opening and closing is controlled by varying the phase relationship between the camshaft and the crankshaft. In the above patent, the timing of the valve opening and closing is controlled by varying the timing of solenoid activation.

(3) The above patent requires at least two solenoids per valve for valve operation. The present invention does not require solenoids for valve operation. It employs only two solenoid valves per engine, and they serve only for periodic switching of the engine operation from one mode to another one.

(4) In the above patent, switching from two-stroke to four-stroke cycle requires disabling the valve every other camshaft revolution. In the present invention, switching from two-stroke to four-stroke cycle is performed by switching from one cam lobe to another one.

The main disadvantages of the system described in the above patent are high cost and complexity, associated with the large number of solenoids required, and an increase in electrical energy consumption needed for solenoid operation.

OBJECTS AND ADVANTAGES

One object of the present invention is to reduce the cost and complexity of an air-hybrid system by developing a camshaft-based valve train suitable for operation in an air-hybrid engine. Camshaft-based valve train is simple and inexpensive, and using it instead of the complicated and costly electrohydraulic camless valve train achieves the stated objective.

Another object of the present invention is to improve the reliability of the air-hybrid system. This too is accomplished by replacing a camless valve train with a camshaft-based system. Camless valve train carries a risk of piston-to-valve collision, which can lead to engine failure. In a system using camshafts, such risk is almost non-existent.

Still another object of the present invention is to reduce consumption of energy for valve operation in an air-hybrid engine. Operating a camless electrohydraulic valve train involves conversion of engine mechanical energy into hydraulic energy, to drive the valves, and into electric energy, to operate the solenoid valves. This is an inefficient process that adversely affects the system efficiency. On the other hand, a camshaft is a relatively low friction device that requires very little of the engine energy for its operation. Thus, using a more energy-efficient camshaft-based valve train improves the energy consumption of the air hybrid.

A further object of the present invention is to facilitate conversion of fleets of existing conventional vehicles into air-hybrid vehicles. If both a conventional and an air-hybrid engine are equipped with camshaft-based valve trains, the conversion does not require a new air-hybrid engine installation. The conventional engine can be transformed into an air-hybrid engine by making changes in its camshaft-based valve train. This makes the conversion relatively inexpensive.

SUMMARY OF THE INVENTION

In a conventional automotive vehicle, the energy of vehicle motion is absorbed by vehicle brakes and dissipated as heat during braking. Attempts to overcome such waste of energy led to development of systems in which the energy of vehicle motion is not dissipated during braking, but converted into a form in which it can be temporarily stored and, then, used again to accelerate the vehicle at a later time. An electric hybrid is a typical and currently prevailing example of such system. An electric hybrid vehicle has two power plants, an internal combustion engine and an electric generator/motor. It also includes an electric battery for energy storage. It is the generator/motor that performs the braking energy absorption and recovery. The cost and complexity of electric hybrid is very high. An air hybrid is simpler and costs less.

In an air-hybrid vehicle, the internal combustion engine itself absorbs the vehicle braking energy by operating as a compressor, during braking, and deposits the compressed air into an air reservoir for storage. Then, during acceleration, the energy of compressed air assists the engine in propelling the vehicle.

An air-hybrid vehicle operates in two basic operational modes: a primary one and an auxiliary one. In the primary mode, the vehicle engine operates as a conventional internal-combustion engine using fuel energy to propel the vehicle. In the auxiliary mode, the engine converts kinetic energy of the vehicle into energy of compressed air, during braking, and uses it to assist in vehicle propulsion at a later time. Proper operation and control of the engine valvetrain is crucial to efficient operation of the air-hybrid system.

During a conventional four-stroke operation, each engine valve opens once every two crankshaft revolutions, and the duration of each valve event is longer than the duration of the piston stroke. In contrast to that, during operation in the auxiliary mode, the engine must be able to operate in two-stroke modes such as the two-stroke compressor or the two-stroke air motor. In those modes, each engine valve opens once during each crankshaft revolution, and the duration of each valve opening is considerably shorter than the duration of the piston stroke. Moreover, to keep the thermodynamic cycle efficient, it must be frequently adjusted to accommodate changes in the air-reservoir pressure. This requires frequent changes in the valve event timing and duration. Hence, the basic requirement for an air-hybrid engine valvetrain is that it must be able to perform frequent switching from long-event duration, four-stroke operation to short-event duration, two-stroke operation and back. It also must provide for a variable valve timing and event duration.

Until now, it was generally assumed that, to meet the above requirement, an air-hybrid must use an electronically controlled camless system that provides total variability of the valve timing and valve opening duration. A major disadvantage of such system is its cost and complexity, as well as some reliability issues. The present invention describes an air-hybrid vehicle using an engine with camshaft-driven engine valves. Such system is considerably less expensive and much more reliable than a system with camless valvetrain.

The present invention describes an air-hybrid engine that employs uniquely designed camshafts and cam lobe activators, and conventional camshaft phase shifters to operate and control the engine valves. It uses a different cam lobe for operating an engine valve during each of the two operational modes, and it uses camshaft phase shifters to vary the valve event timing and duration. The system exploits non-linearity that exists in relationship between the piston motion and the camshaft rotation. Thanks to the above non-linearity, varying the phase relationship between the camshaft and the engine crankshaft in a pre-determined specific way varies the duration of the engine valve opening in the required way, thus varying the volumes of air received into and discharged from the engine. This permits to control the compression and expansion ratios, during operation in the auxiliary operational mode, as well as the engine torque.

BRIEF DESCRIPTION OF THE DRAWINGS

FIGS. 5 and 5A to 5D is a schematic illustration of a camshaft and double-input activator arrangement.

DETAILED DESCRIPTION OF A PREFERRED EMBODIMENT

FIGS. 1 to 9

A preferred embodiment of the present invention is illustrated in FIGS. 1 to 9.

1. The Engine

Figure 1:
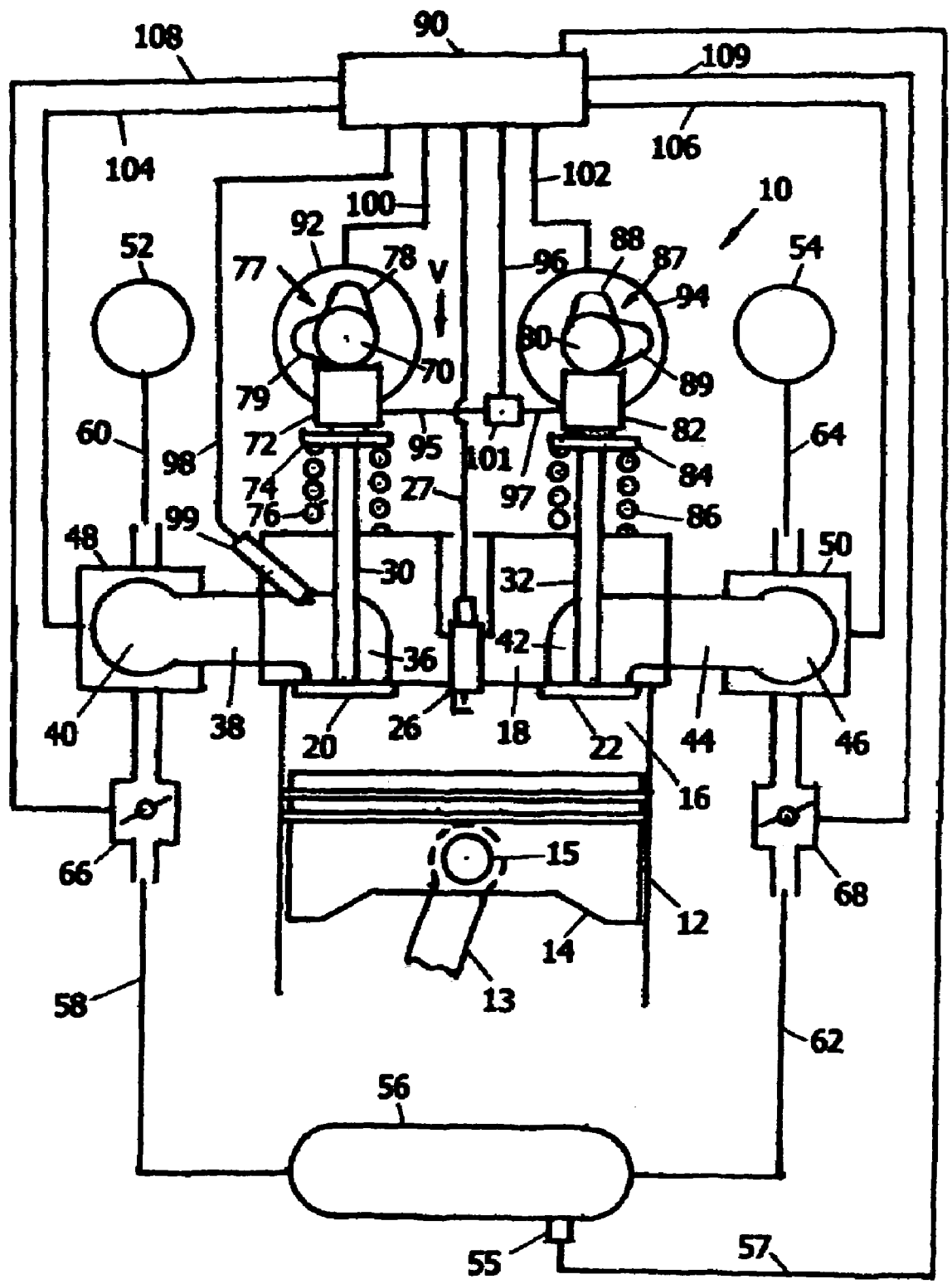
FIG. 1 is a schematic, cross-sectional side-view of an engine cylinder and head arrangement and its gas exchange system controlling the cylinder connection to outside atmosphere and to a compressed-air reservoir.
Figure 2:
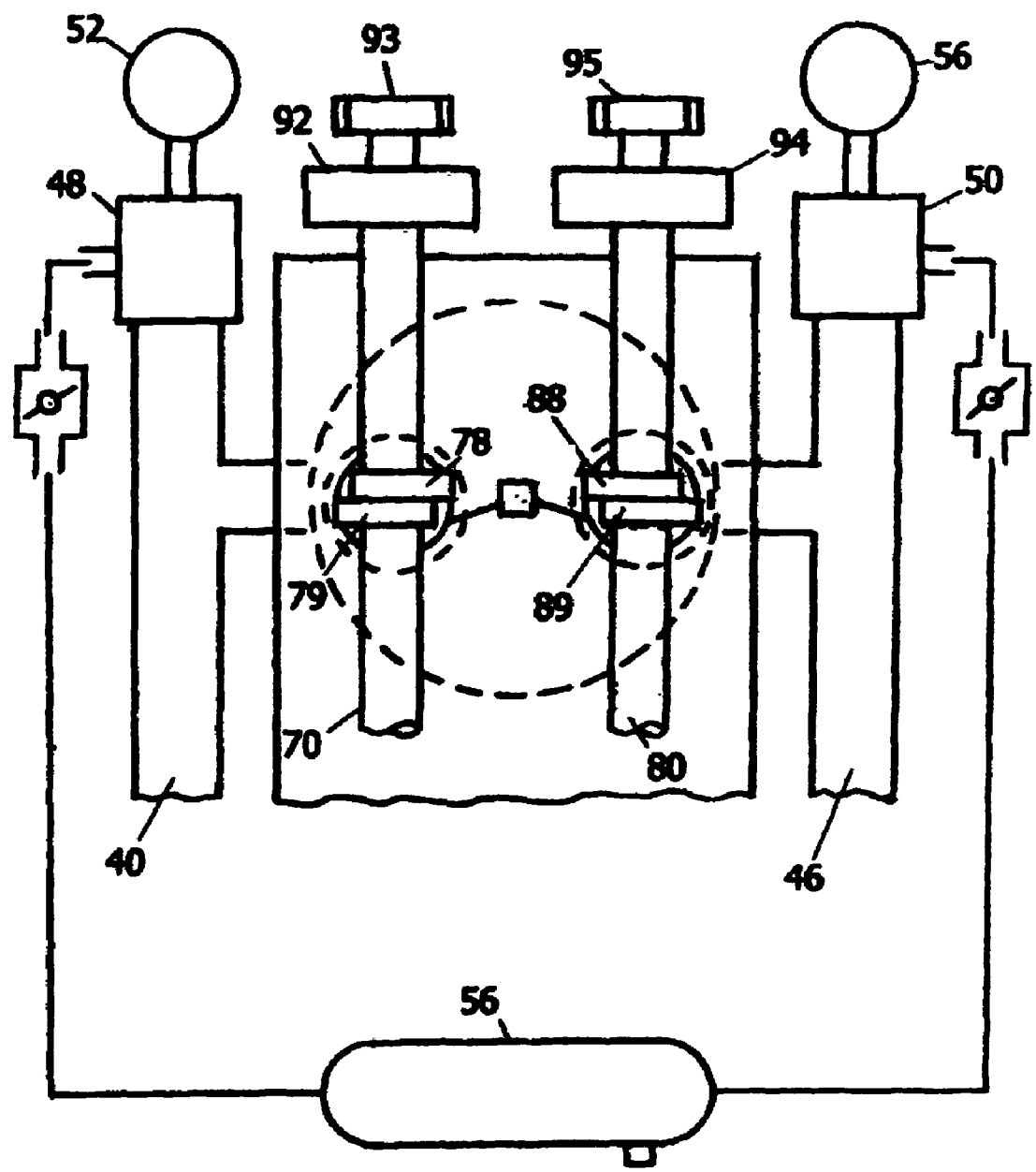
FIG. 2 complements FIG. 1. It is a schematic, plane view of the same cylinder as seen looking in the direction of arrow V in FIG. 1.

FIG. 1 is a schematic, cross-sectional side-view of an engine cylinder and head arrangement and its gas exchange system controlling the cylinder connection to outside atmosphere and to a compressed-air reservoir. FIG. 2 complements FIG. 1. It is a schematic, plane view of the same cylinder as seen looking in the direction of arrow V in FIG. 1. An engine 10 has at least one cylinder 12 containing a piston 14. Piston 14 is mounted upon a connecting rod 13 by a wrist pin 15 and can reciprocate in cylinder 12, thus varying the volume of a cylinder chamber 16 enclosed between piston 14 and a cylinder head 18 attached to the top of cylinder 12.

Two types of normally-closed valves, a first valve 20 and a second valve 22, are installed in cylinder head 18. Valves 20 and 22 are slideably mounted in guides 30 and 32, respectively, which are arranged in cylinder head 18. Depending on the needs of the engine, there may be more than one valve of each type in each engine cylinder. A conventional spark plug 26 and a port fuel injector 99 are also mounted within cylinder head 18. If engine 10 is a diesel, there is no need for spark ignition and port fuel injection, and spark plug 26 and fuel injector 99 are replaced by a high-pressure fuel injector for direct fuel injection.

Figure 4:
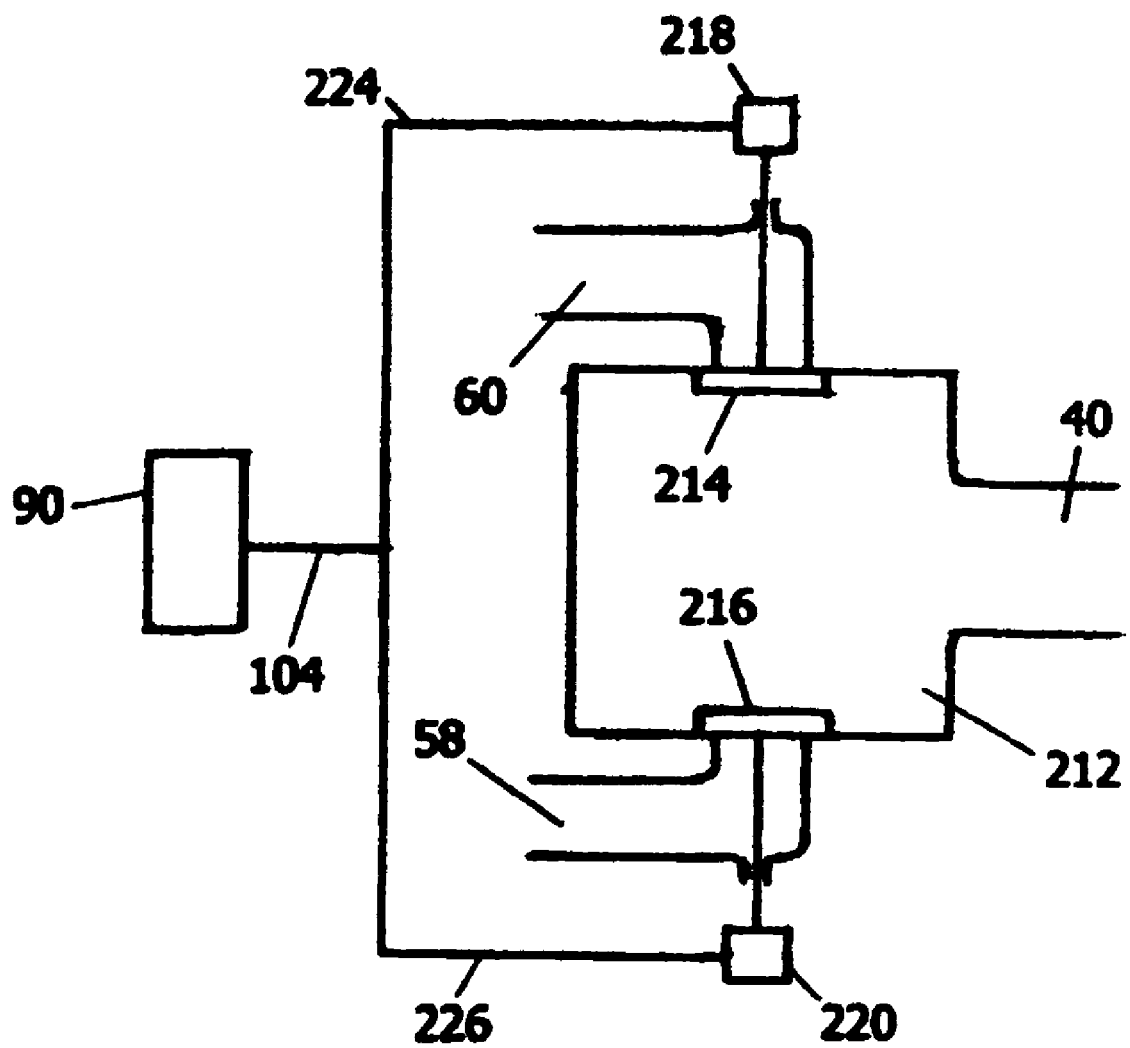
FIG. 4 is a schematic illustration of a typical two-way switching box that can be used in the present invention.

First valve 20 is shown in its closed position in which it separates cylinder chamber 16 from a first port 36, which opens into a first passage 38. First passage 38 connects to a first manifold 40, to which all first ports and all first passages from all engine cylinders are connected. First manifold 40 is connected to a first switching box 48, which can connect first manifold 40 either to a compressed-air reservoir 56, via a duct 58, or to an intake system 52, via a duct 60, and from there, to outside atmosphere. A return spring 76 tends to keep first valve 20 closed. A more detailed description of switching box 48 is given in a later text and is illustrated in FIG. 4.

Second valve 22 is shown in its closed position in which it separates cylinder chamber 16 from a second port 42, which opens into a second passage 44. Second passage 44 connects to a second manifold 46, to which all second ports and all second passages from all engine cylinders are connected. Second manifold 46 is connected to a second switching box 50, which can connect second manifold 40 either to a compressed-air reservoir 56, via a duct 62, or to an exhaust system 54, via a duct 64, and from there, to outside atmosphere. A return spring 86 tends to keep second valve 22 closed. The design of switching box 50 is the same as that of switching box 48.

A controllable flow restrictor 66 is incorporated into duct 58, and a controllable flow restrictor 68 is incorporated into duct 62. Flow restrictors 66 and 68 are optional. They add flexibility to operation and control of the system, but the system can operate without the restrictors. In addition, an intake air throttle (not shown) is, in most cases, an integral part of the engine intake system.

A first camshaft 70 is mounted above cylinder head 18. First camshaft 70 actuates first valve 20 via a first activator 72 interposed between first camshaft 70 and a valve tappet 74 attached to first valve 20. First camshaft 70 also actuates first valves in other engine cylinders. A first compound cam lobe 77 is integral with first camshaft 70. It includes two types of cam lobes, a primary cam lobe 78 and an auxiliary cam lobe 79. When first camshaft 70 rotates, both cam lobes, 78 and 79, act upon first activator 72. Hence first activator 72 is a double-input activator. First activator 72 is designed so that, depending on its setting, either cam lobe 78 or cam lobe 79 transmits its motion to first valve 20. Thus first valve 20 can be selectively actuated either by primary cam lobe 78, or by auxiliary cam lobe 79.

A second camshaft 80 is too mounted above cylinder head 18. Second camshaft 80 actuates second valve 22 via a second activator 82 interposed between second camshaft 80 and a valve tappet 84 attached to second valve 22. Second camshaft 80 also actuates second valves in other engine cylinders. A second compound cam lobe 87 is integral with second camshaft 80. It includes two cam lobes, a primary cam lobe 88 and an auxiliary cam lobe 89. When second camshaft 80 rotates, both cam lobes, 88 and 89, act upon second activator 82. Hence second activator 82 is a double-input activator. Second activator 82 is designed so that, depending on its setting, either cam lobe 88 or cam lobe 89 transmits its motion to second valve 22. Thus second valve 22 can be selectively actuated either by primary cam lobe 88 or by auxiliary cam lobe 89.

Figure 6:
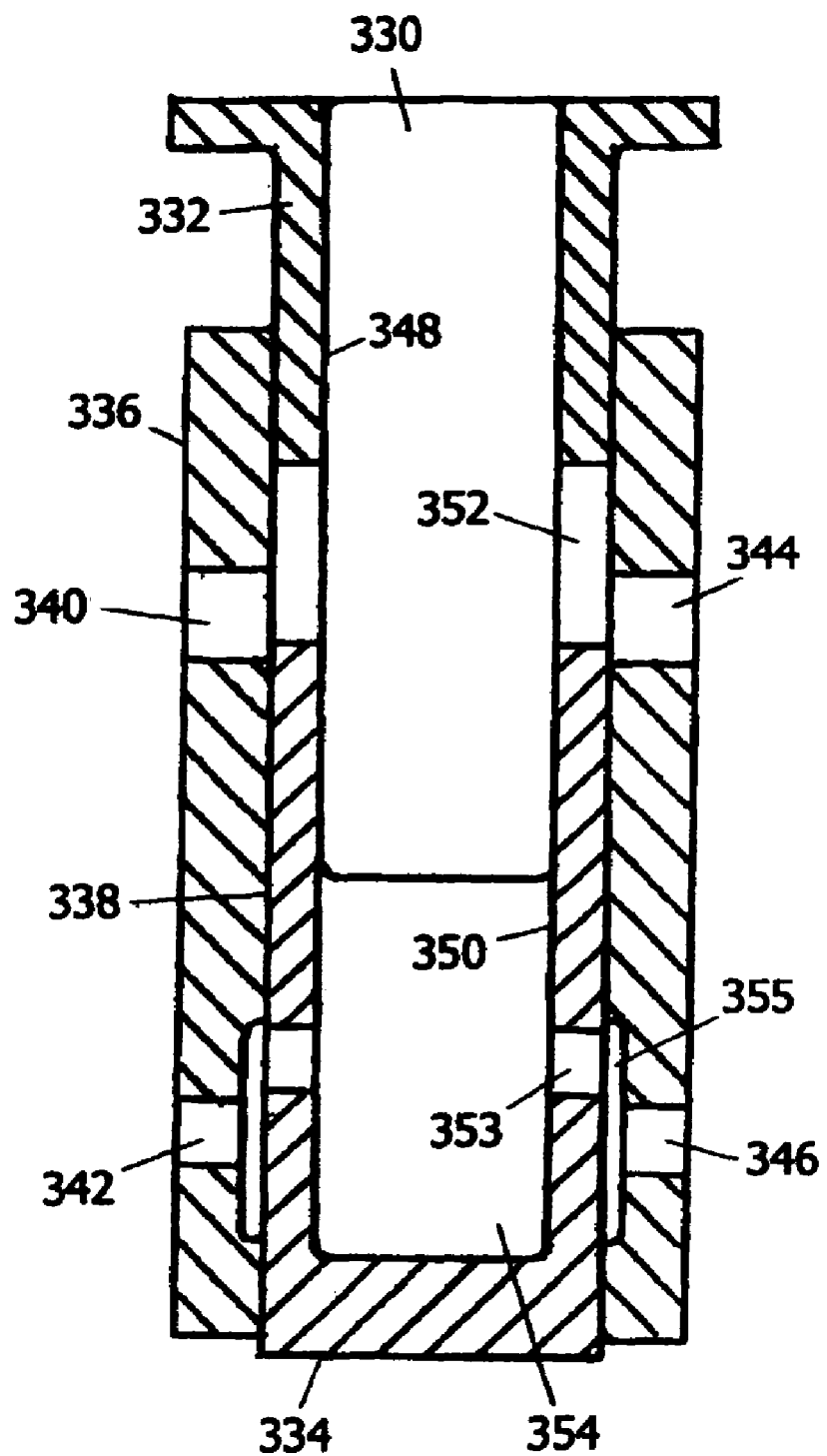
FIG. 6 is an enlarged crossection of activator 311 shown in FIG. 5.
Figure 7:
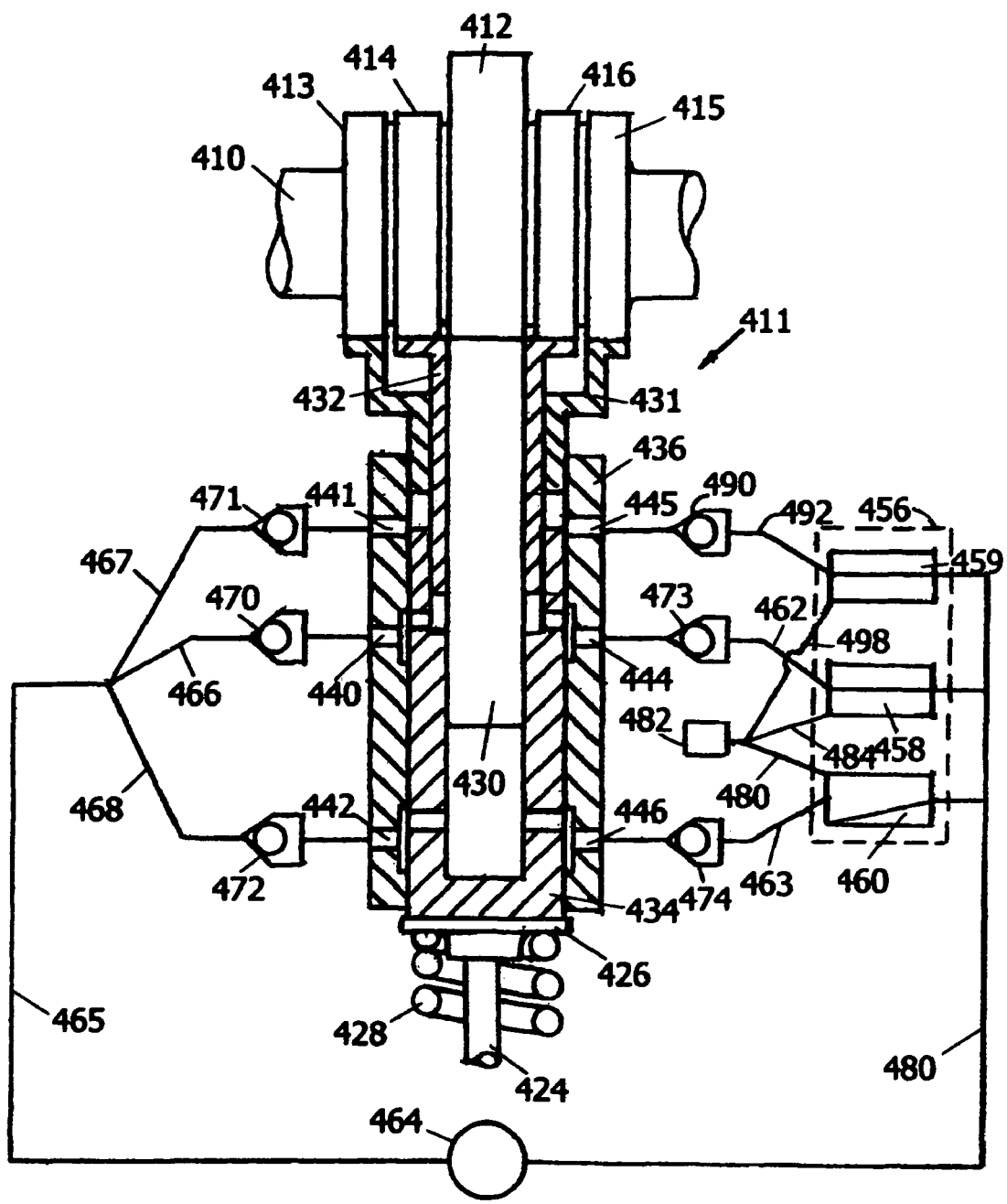
FIG. 7 is a schematic illustration of a camshaft and triple-input activator arrangement.
Figure 8:
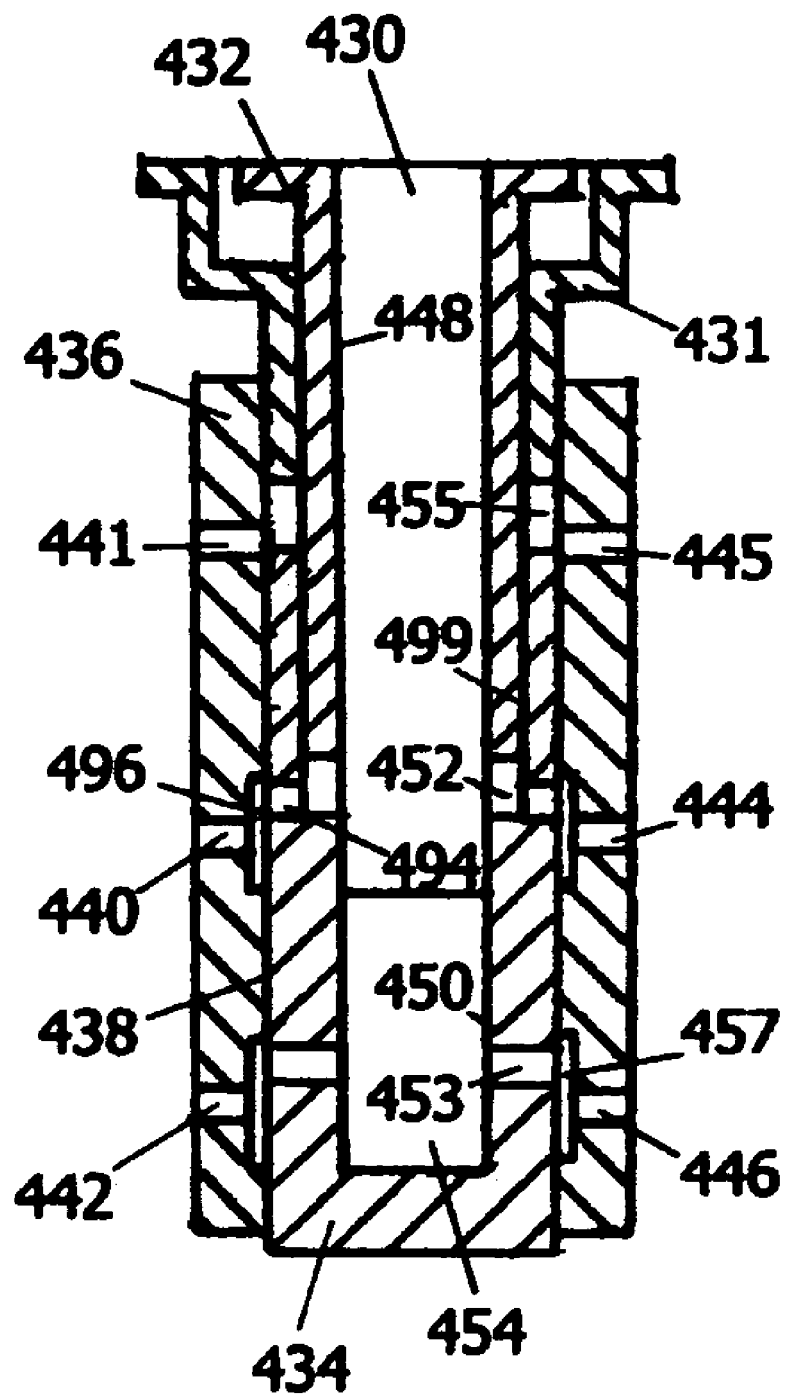
FIG. 8 is a crossection of activator 411 shown in FIG. 7.

A detailed description of the design and operation of a double-input activator such as activators 72 and 82 is given in a later text, and it is illustrated in FIGS. 5, 5A to 5D, and 6. In some cases, it may be useful to use camshafts with compound cam lobes that include three types of cam lobes each: a primary cam lobe, a first auxiliary camlobe, and a second auxiliary cam lobe. This requires activators that can selectively and alternatively transmit the motion of each of the three cam lobes to the engine valve. A detailed description of the design and operation of such triple-input activator is given in a later text, and it is illustrated in FIGS. 7 and 8.

Phase shifters 92 and 94 are mounted on the ends of camshafts 70 and 80, respectively. A phase shifter is a device that can vary the phase relationship between the camshaft and the crankshaft in an internal-combustion engine. They are often used in modern engines to optimize the timing of the intake valves operation. Sprockets 93 and 95 (FIG. 2) are driven from the engine crankshaft (not shown) by a chain drive (not shown). Sprockets 93 and 95 transmit motion from the engine crankshaft to phase shifters 92 and 94, respectively, and from there to camshafts 70 and 80, respectively. The design of the phase shifters includes mechanical stops that prevent phase shifting the camshaft beyond the range of safe operation.

A control system 90 controls operation of the above described gas exchange controlling system. It also controls operation of spark plugs, fuel injectors, and numerous other engine and vehicle components (not shown). Control system 90 receives input signals (not shown) from a system of sensors installed in the engine and in the vehicle (not shown). It also receives an air pressure signal from a pressure sensor 55 installed in compressed-air reservoir 56 via an electric cable 57. The signals generated by the sensors inform the control system about vehicle driver's demands for a specific vehicle propulsion or braking force, as the case may be. Propulsion force is force acting on the vehicle in a direction of its motion. Braking force is force acting on the vehicle in a direction opposite to its motion. The input signals also carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

Control system 90 is an on-board computer programmed to control operation of various components of the engine and the vehicle in accordance with a strategy program incorporated into its software. The software contains algorithms and data that permit the control system to evaluate the stream of input signals and determine the magnitude and the timing of each output signal. The output signals controlling operation of the engine and other vehicle components are updated at least once every engine cycle.

Control system 90 controls the setting of activators 72 and 82 by sending control signals, via an electric cable 96, to an activator controller 101 that is connected to first activator 72 and to second activator 82 via hydraulic conduits 95 and 97, respectively. It also controls the setting of all activators in other engine cylinders.

Control system 90 controls phase relationship between first camshaft 70 and the engine crankshaft by sending control signals to first phase shifter 92 via an electric cable 100. It also controls phase relationship between second camshaft 80 and the engine crankshaft by sending control signals to second phase shifter 94 via an electric cable 102.

Control system 90 controls the settings of switching boxes 48 and 50 by sending control signals via electric cables 104 and 106, respectively. It can also control the settings of restrictors 66 and 68 (if any) by sending control signals via electric cables 108 and 109, respectively. Operation of spark plug 26 and fuel injector 99 is controlled by control system 90 via electric cables 27 and 98, respectively.

Connecting an engine cylinder alternatively to outside atmosphere and to a compressed-air reservoir can also be performed without resorting to switching boxes. Instead, the engine gas-exchange controlling system can be equipped with a third type of a valve, in each engine cylinder, and a third manifold that are dedicated to connecting each cylinder to the compressed-air reservoir. Such an arrangement is illustrated in FIG. 3.

Figure 3:
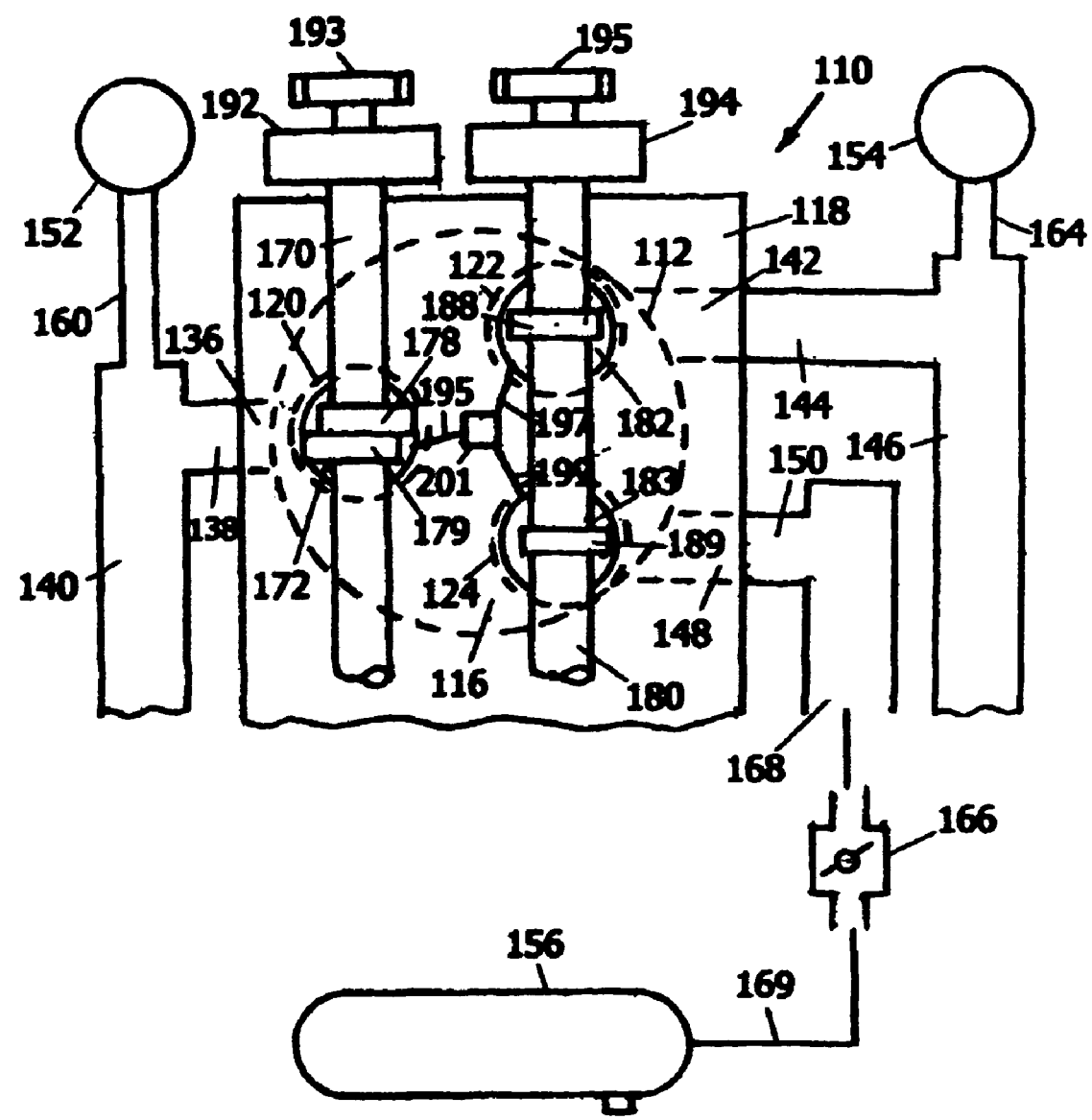
FIG. 3 is a schematic, plane view of an engine cylinder and its gas exchange controlling system with three types of valves, as seen looking from above the cylinder head.

FIG. 3 is a schematic, plane view of an engine cylinder and its gas exchange controlling system with three types of valves, as seen looking from above the cylinder head. An engine 110 has at least one cylinder 112, which has the same reciprocating-piston arrangement as in cylinder 12 illustrated in FIG. 1. However, in contrast to cylinder 12 (FIGS. 1 and 2), cylinder 112 has three types of normally-closed valves installed in a cylinder head 118: a first valve 120, a second valve 122, and a third valve 124. Depending on the needs of the engine, there may be more than one valve of each type in each engine cylinder. In other respects, the general arrangement of cylinder 112 and cylinder head 118 is similar to that of cylinder 12 and cylinder head 18 (FIGS. 1 and 2).

First valve 120, in its closed position, separates a cylinder chamber 116 from a first port 136, which opens into a first passage 138. First passage 138 connects to a first manifold 140, to which all first ports and all first passages from all engine cylinders are connected. First manifold 140 is connected to an intake system 152 via a duct 160 and, from there, to outside atmosphere.

Second valve 122, in its closed position, separates a cylinder chamber 116 from a second port 142, which opens into a second passage 144. Second passage 144 connects to a second manifold 146, to which all second ports and all second passages from all engine cylinders are connected. Second manifold 146 is connected to an exhaust system 154 via a duct 164 and, from there, to outside atmosphere.

Third valve 124, in its closed position, separates a cylinder chamber 116 from a third port 148, which opens into a third passage 150. Third passage 150 connects to a third manifold 168, to which all third ports and all third passages from all engine cylinders are connected. Third manifold 168 is connected to a compressed-air reservoir 156 via a duct 169.

A controllable flow restrictor 166 is incorporated into duct 169. Flow restrictor 166 is optional. It adds flexibility to operation of the system, but the system can operate without the restrictor. In addition, an intake air throttle (not shown) is, in most cases, an integral part of the engine intake system.

A first camshaft 170 is mounted above cylinder head 118. First camshaft 170 actuates first valve 120 via a first activator 172 interposed between first camshaft 170 and first valve 120. First camshaft 170 also actuates first valves in other engine cylinders. It has a compound cam lobe that includes two cam lobes, a primary cam lobe 178 and an auxiliary cam lobe 179. When first camshaft 170 rotates, both cam lobes, 178 and 179, act upon first activator 172. Thus it is a double-input activator. First activator 172 is designed so that, depending on its setting, either cam lobe 178 or cam lobe 179 transmits its motion to first valve 120. Thus first valve 120 can be selectively actuated either by primary cam lobe 178, or by auxiliary cam lobe 179.

Figure 9:
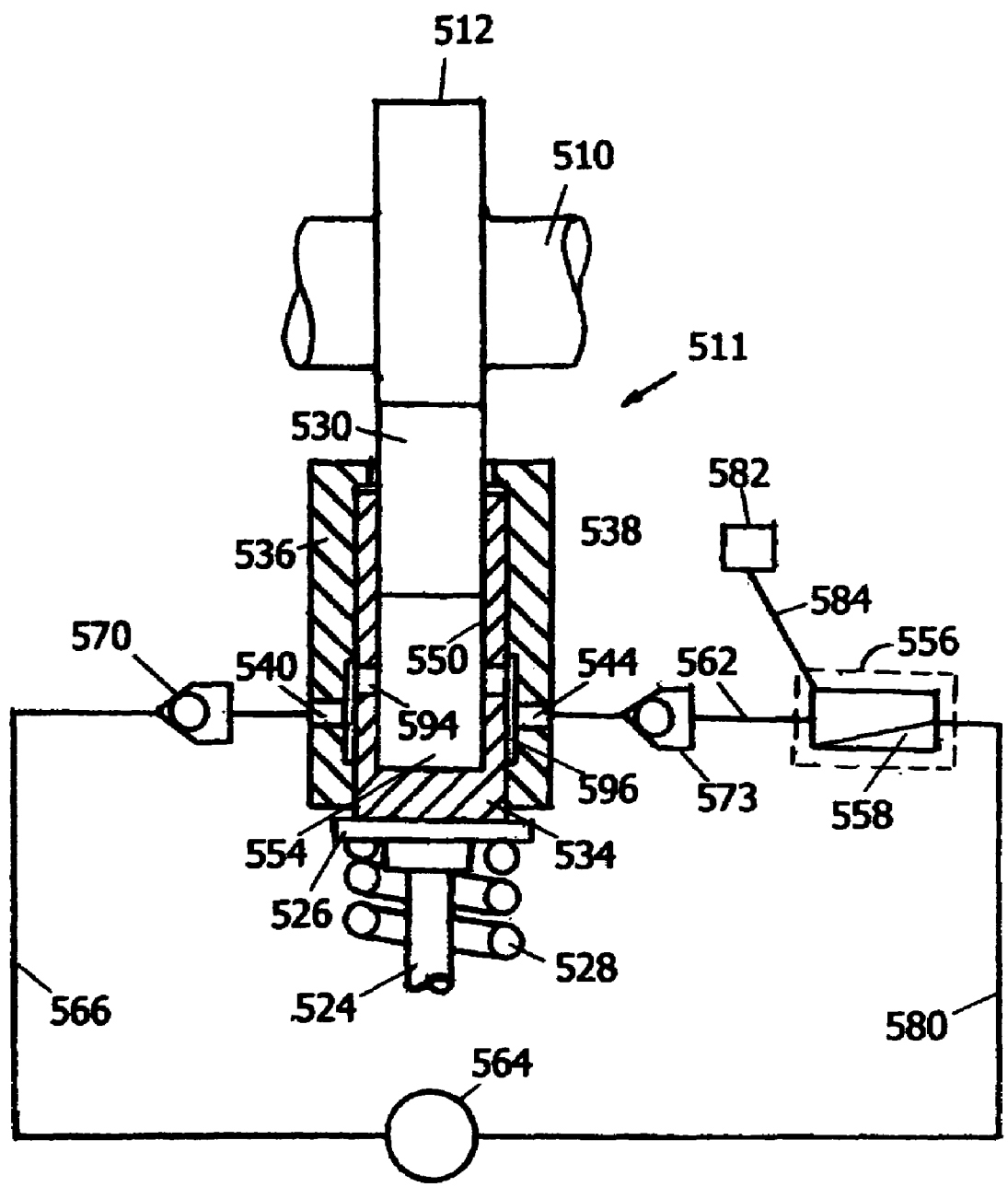
FIG. 9 is a schematic illustration of a camshaft and single-input activator arrangement.

A second camshaft 180 is too mounted above cylinder head 118. Second camshaft 180 actuates second valve 122 via a second activator 182 interposed between second camshaft 180 and second valve 122. It also actuates third valve 124 via a third activator 183 interposed between second camshaft 180 and third valve 124. Activators 182 and 183 are single-input activators. Second camshaft 180 also actuates second and third valves in other engine cylinders. It includes two cam lobes for each cylinder, a primary cam lobe 188 and an auxiliary cam lobe 189. When second camshaft 180 rotates, cam lobes 188 and 189 act upon second activator 182 and upon third activator 183, respectively. Second activator 182 and third activator 183 are designed so that, depending on their setting, either cam lobe 188 transmits its motion to second valve 122, and third valve 124 is deactivated; or cam lobe 189 transmits its motion to third valve 124, and second valve 122 is deactivated. A detailed description of the design and operation of a single-input activator such as activators 182 and 183 is given in a later text, and it is illustrated in FIG. 9.

An activator controller 201 is connected to first activator 172, to second activator 182, and to third activator 183 via hydraulic conduits 195, 197, and 199, respectively. It also controls the setting of all activators in other engine cylinders.

Phase shifters 192 and 194 are mounted on the ends of camshafts 170 and 180, respectively. Sprockets 193 and 195 are driven from the engine crankshaft (not shown) by a chain drive (not shown). Sprockets 193 and 195 transmit motion from the engine crankshaft to phase shifters 192 and 194, respectively, and from there to camshafts 170 and 180, respectively. A control system (not shown) controls the operation of the gas exchange controlling system illustrated in FIG. 3 in the same way control system 90 controls operation of the gas exchange controlling system illustrated in FIGS. 1 and 2.

2. Switching Box

FIG. 4 is a schematic illustration of a typical two-way switching box that can be used in the present invention. The design is described as applied to the case of switching box 48 (FIG. 1), but it can also be used in the case of switching box 50 (FIG. 1) and in other cases. A housing 212 includes two valves, 214 and 216, which can be operated by actuators 218 and 220, respectively. In the drawing, both valves are shown in closed position. Various electrical, pneumatic, or hydraulic devices can be used as the above actuators. Control system 90 can selectively open or close the two valves, 214 and 216, by sending control signals to actuators 218 and 220 via cable 104, which divides into electric lines 224 and 226, respectively. The switching box can be in one or another of two positions: In one, valve 214 is open while valve 216 is closed. In this position, manifold 40 (FIG. 1) is connected to duct 60 (FIG. 1). In the second position, valve 216 is open while valve 214 is closed. In this position, manifold 40 is connected to duct 58 (FIG. 1).

3. Double-Input Activator

FIGS. 5 and 5A to 5D is a schematic illustration of a camshaft and activator arrangement for selectively and alternatively actuating an engine valve by at least one cam lobe of a specific shape selected from a set of cam lobes that includes cam lobes with two different shapes. The arrangement is described below as a generic case, but a similar arrangement can be used for actuating any and all valves in engine 10 (FIG. 1). FIG. 6 is an enlarged crossection of activator 311 shown in FIG. 5.

A camshaft 310 rotates with half the crankshaft speed. It has three cam lobes, a primary cam lobe 312 and two auxiliary cam lobes, 314 and 316, for each engine valve. A lateral crossection of cam lobe 312, showing its shape in a plane perpendicular to the camshaft axis, is shown in FIG. 5A. It has a single lobe 318. Cam lobes 314 and 316 are identical to each other. A lateral crossection of cam lobe 314 (the same as camlobe 316), showing its shape in a plane perpendicular to the camshaft axis, is shown in FIG. 5B. It has two lobes, 320 and 322, on opposite ends of its circumference.

Rotation of camshaft 310 controls the motion of an engine valve 324 by operating an activator 311 that can apply a valve-opening force to a valve tappet 326. A valve spring 328 provides a valve-closing force. Activator 311 has three main moving parts: a first input member 330, a second input member 332, and an output member 334. First input member 330 is driven by cam lobe 312. Second input member 332 is driven by cam lobes 314 and 316. Output member 334 drives engine valve 324.

An activator housing 336 (see FIG. 6) is attached to the engine cylinder head. Housing 336 has a cylindrical hole 338, coaxial with the axis of engine valve 324, two inlet ports, 340 and 342, and two outlet ports, 344 and 346. Second input member 332 and output member 334 slidingly fit into hole 338. First input member 330 slidingly fits into a cylindrical hole 348, inside second input member 332, and into a cylindrical hollow 350 inside output member 334. The installation of the three members, inside activator 311, forms two hydraulic chambers: a ring-shaped first chamber 352 and a cylindrical second chamber 354. First chamber 352 is always connected to inlet port 340 and to outlet port 344. Second chamber 354 is always connected to inlet port 342 and to outlet port 346, via an opening 353 and an annulus 355.

A controller 356 (see FIG. 5) includes two solenoid valves, 358 and 360. A hydraulic line 362 connects solenoid valve 358 to outlet port 344. A hydraulic line 363 connects solenoid valve 360 to outlet port 346. The system also includes a source of pressurized incompressible fluid 364 that supplies the fluid to inlet ports 340 and 342 through a hydraulic line 365 that divides into hydraulic lines 366, and 368. The engine oil system can serve as the source of pressurized fluid. Other liquids can also serve as the incompressible fluid used in the above system. Check valves 370 and 372 are incorporated into lines 366 and 368, respectively. Check valves 373, and 374 are incorporated into lines 362 and 363, respectively. The check valves prevent backflow of fluid from activator 311 back to source 364, and from controller 356 back to activator 311. From solenoid valves 358 and 360, the fluid can return back to source 364 via a hydraulic line 380.

A control system 382 controls the operation of controller 356 by sending control signals to solenoid valves 358 and 360, via electric wires 384 and 380, respectively.

4. Triple-Input Activator

FIG. 7 is a schematic illustration of a camshaft and activator arrangement for selectively and alternatively actuating an engine valve by at least one cam lobe of a specific shape selected from a set of cam lobes that includes cam lobes with three different shapes. The arrangement is described below as a generic case, but a similar arrangement can be used for actuating any and all valves in engine 10 (FIG. 1). FIG. 8 is a crossection of activator 411 shown in FIG. 7.

A camshaft 410 rotates with half the crankshaft speed. It has five cam lobes, a primary cam lobe 412, two first auxiliary cam lobes, 414 and 416, and two second auxiliary cam lobes, 413 and 415, for each engine valve. Cam lobes 412, 414, and 416 have the same shape as cam lobes 312, 314, and 316, respectively, in FIGS. 5, 5A, and 5B. Cam lobe 412 has one lobe, and cam lobes 414 and 416 have two lobes each. Cam lobes 413 and 415 are identical to each other and may have either one or two lobes each, depending on the need of the engine.

Rotation of camshaft 410 controls the motion of an engine valve 424 by operating an activator 411 that can apply a valve-opening force to a valve tappet 426. A valve spring 428 provides a valve-closing force. Activator 411 has four main moving parts: a first input member 430, a second input member 432, a third input member 431, and an output member 434. First input member 430 is driven by cam lobe 412. Second input member 432 is driven by cam lobes 414 and 416. Third input member 431 is driven by cam lobes 413 and 415. Output member 434 drives engine valve 424.

An activator housing 436 (see FIG. 8) is attached to the engine cylinder head. Housing 436 has a cylindrical hole 438, coaxial with the axis of engine valve 424, three inlet ports, 440, 442, and 441; and three outlet ports, 444, 446, and 445. Third input member 431 and output member 434 slidingly fit into hole 438. Second input member 432 slidingly fits into a cylindrical hollow 499, inside output member 434. First input member 430 slidingly fits into a cylindrical hole 448, inside second input member 432, and into a cylindrical hollow 450 inside output member 434. The installation of the four members, inside activator 411, forms three hydraulic chambers: a ring-shaped first chamber 452, a cylindrical second chamber 454, and a ring-shaped third chamber 455. First chamber 452 is always connected to inlet port 440 and to outlet port 444, via an opening 494 and an annulus 496. Second chamber 454 is always connected to inlet port 442 and to outlet port 446, via an opening 453 and an annulus 457. Third chamber 455 is always connected to inlet port 441 and to outlet port 445.

A controller 456 (see FIG. 7) includes three solenoid valves, 458, 460, and 459. A hydraulic line 462 connects solenoid valve 458 to outlet port 444. A hydraulic line 463 connects solenoid valve 460 to outlet port 446. A hydraulic line 492 connects solenoid valve 459 to outlet port 445. The system also includes a source of pressurized incompressible fluid 464 that supplies the fluid to inlet ports 440, 442, and 441 through a hydraulic line 465 that divides into hydraulic lines 466, 468, and 467, respectively. The engine oil system can serve as the source of pressurized fluid. Check valves 470, 472, and 471 are incorporated into lines 466, 468, and 467, respectively. Check valves 473, 474, and 490 are incorporated into lines 462, 463, and 492, respectively. The check valves prevent backflow of fluid from activator 411 back to source 464, and from controller 456 back to activator 411. From solenoid valves 458, 460, and 459, the fluid can return back to source 464 via a hydraulic line 480.

A control system 482 controls the operation of controller 456 by sending control signals to solenoid valves 458, 460, and 459, via electric wires 484, 480, and 498, respectively.

5. Single-Input Activator

FIG. 9 is a schematic illustration of a camshaft and activator arrangement for actuating an engine valve by a cam lobe of a specific shape, which may have either one lobe (as in FIG. 5A) or two lobes (as in FIG. 5B), depending on the engine needs. The arrangement is described below as a generic case, but a similar arrangement can be used for actuating some of the valves in engine 110 (FIG. 3).

A camshaft 510 rotates with half the crankshaft speed. It has a single cam lobe 512 for each engine valve. Rotation of a camshaft 510 controls the motion of an engine valve 524 by operating an activator 511 that can apply a valve-opening force to a valve tappet 526. A valve spring 528 provides a valve-closing force. Activator 511 has two main moving parts: an input member 530 and an output member 534. Input member 530 is driven by cam lobe 512. Output member 534 drives engine valve 524.

An activator housing 536 is attached to the engine cylinder head. Housing 536 has a cylindrical hole 538, coaxial with the axis of engine valve 524, an inlet port 540 and an outlet port 544. Output member 534 slidingly fits into hole 538. Input member 530 slidingly fits into a cylindrical hollow 550 inside output member 534. The installation of the two members, inside activator 511, forms a cylindrical hydraulic chamber 554. Chamber 554 is always connected to inlet port 540 and to outlet port 544, via an opening 594 and an annulus 596.

A controller 556 includes a solenoid valve 558. A hydraulic line 562 connects solenoid valve 558 to outlet port 544. The system also includes a source of pressurized incompressible fluid 564 that supplies the fluid to inlet port 540 through a hydraulic line 566. The engine oil system can serve as the source of pressurized fluid. A check valve 570 is incorporated into line 566. A check valve 573 is incorporated into line 562. The check valves prevent backflow of fluid from activator 511 back to source 564, and from controller 556 back to activator 511. From solenoid valve 558, the fluid can return back to source 564 via a hydraulic line 580.

A control system 582 controls the operation of controller 556 by sending control signals to solenoid valve 558, via an electric wire 584.

Those skilled in art will appreciate in view of this disclosure that other engine valves arrangements and alternative methods of gas exchange in the engine, other arrangements for supplying the control system with necessary information, other methods of actuation of the key components of the system, possibly including other types of sensors and actuators, other means of signal transmission, and other methods of energy retention in or extraction from the air may be used according to the present invention. Rotary valves, plate valves, and other types of valves can be used instead of poppet-type valves in the switching arrangements, and these valves may be located far apart instead of being in close proximity to each other.

The above description of the multi-input camshaft-driven valve activation system described an arrangement, in which the camshaft-driven activator acts directly on the tappet of the engine valve. Those skilled in art will appreciate in view of this disclosure that other types of arrangements, in which an activator activates a cam lobe and an engine valve, may be used to effectuate the valve operation according to the present invention. For example, in some engines, the camshaft is not installed above the cylinder head, but is located in the proximity of the crankshaft, and the camshaft-induced motion is transmitted to the engine valve through a mechanical system that includes a pushrod. In such engine, the activator would be interposed between the camshaft and the pushrod, and the activator housing would be attached to some stationary part of the engine. Even in engines with over-the-head camshaft, the camshaft is often not directly over the valve and acts on the valve through a system of levers. In such case, the activator can act on the valve through a system of levers. If the engine cylinder has two first valves and/or two second valves, two valves of the same type can be joined by a rigid bridge, and the activator would act on the bridge, thus moving the two valves together. Other variations of the basic design are possible. For example, the description of the double-input activator describes a camshaft with three cam lobes acting on two input members. Those skilled in art will appreciate that two cam lobes can perform the same function. Using three cam lobes improves the design, because it contributes to symmetrical distribution of forces and reduces friction, but in principle, only two cam lobes are needed to drive the two input members. Some other changes to the design of the activator are possible too. The hydraulic pressure area of the input member may be different from the pressure areas of the output members. The above described activators employ a design that features a coaxial arrangement of the input and output members, a circular crossection of each member and only one member of each type. It is clear, however, that such arrangement and such shape of the input and output members are not mandatory for performance of the required function. The input members may be parallel to each other, the crossection of all or some of the members may be non-circular, and the design may incorporate more than one member of each type, operating in-parallel. There may be mechanical stops, inside the activator, that insure that there is some minimal clearance between the cam lobes and the input members when the engine valve is closed. There may also be more than one valve spring, and other spring-like components or substances, such as compressed gas, may be used to close the engine valve. Also, springs can be used inside the activator. A variety of liquids can serve as the incompressible hydraulic fluid, including diesel fuel. Different variants of hydraulic circuits can be used in the activator system. For example, instead of returning the hydraulic fluid, flowing out of the activator, back to the source of the fluid, the returning fluid can bypass the source and flow directly into the hydraulic line leading back to the inlet ports of the activator. In that case, the source of fluid only compensates for leakage. Those skilled in art will appreciate in view of this disclosure that the above listed modifications and numerous other changes can be implemented without deviating from the basic concept, according to the present invention.

DESCRIPTION OF OPERATION OF THE PREFERRED EMBODIMENT

FIGS. 1 to 3 and 5 to 15B

1. Basic Requirements

An air-hybrid vehicle operates in two basic operational modes: a primary one and an auxiliary one. In the primary-mode, the vehicle engine operates as a conventional internal-combustion engine using fuel energy to propel the vehicle. In the auxiliary mode, the engine converts kinetic energy of the vehicle into energy of compressed air during braking, and uses it to assist in vehicle propulsion at a later time. Proper operation and control of the engine valvetrain is crucial to efficient operation of the air-hybrid system.

There are two basic types of auxiliary mode: compressor operation, which is used during vehicle braking, and prime-mover operation, which is used during vehicle propulsion. During compressor mode, the engine operates as a two-stroke compressor receiving air from outside atmosphere, compressing it, and displacing the compressed air into an air reservoir for storage. In prime-mover operation, the engine can operate in either of three basic modes: an air-motor mode, a two-stroke air-power assist, and a four-stroke air-power assist.

In the air motor mode, the engine operates as a two-stroke air motor using energy of compressed air, from the air reservoir, to propel the vehicle. In the two-stroke air-power assist, the engine operates as a two-stroke internal combustion engine supercharged by compressed air from the air reservoir. In the four-stroke air-power assist, the engine operates as a four-stroke internal combustion engine receiving compressed air from the air reservoir. With the exception of the four-stroke air-power assist, all auxiliary modes involve two-stroke cycle operation. A more detailed description of the various modes of hybrid engine operation can be found in referenced U.S. Pat. No. 6,223,846B1.

During a conventional four-stroke operation, each engine valve opens once every two crankshaft revolutions, and the duration of each valve event is longer than the duration of the piston stroke. In contrast to that, during operation in the auxiliary mode, the engine must be able to operate in two-stroke modes such as the two-stroke compressor or the two-stroke air motor. In those modes, each engine valve opens once during each crankshaft revolution, and the duration of each valve event is considerably shorter than the duration of the piston stroke. Moreover, to keep the thermodynamic cycle efficient, it must be frequently adjusted to accommodate changes in the air-reservoir pressure. This requires frequent changes in the valve event timing and duration. Hence, the basic requirement for an air-hybrid engine valvetrain is that it must be able to perform frequent switching from long-event duration, four-stroke operation to short-event duration, two-stroke operation and back. It also must provide for a variable valve timing and event duration. A camshaft-based valvetrain, satisfying the above requirements, is described below. It uses a different cam lobe for operating an engine valve during each of the two operational modes, and it uses camshaft phase shifters to vary the valve event timing and duration.

In the past, it has been generally assumed that, because of the fixed shape of cam lobes, a camshaft-based valvetrain can not provide the variable valve event duration required for the air-hybrid operation. Because of that, only camless electro-hydraulic or electromechanical valvetrains were considered suitable for air-hybrid systems. Those valvetrains are very complicated and very expensive. The present invention offers a new method of operating the engine valves with a camshaft—a method that can provide the variable valve event duration. Using a camshaft-based valvetrain, instead of a camless electrohydraulic or electromechanical one, leads to substantial reduction in cost and complexity of the system and greatly improves its reliability.

A valve event in engine operation is an event during which an engine valve opens, stays open, and closes. The duration of the valve event can be measured in units of time, but, for practical considerations, it is more often either measured in crankshaft (or camshaft) angle degrees or expressed as a fraction of the piston stroke.

2. Switching from Four-Stroke to Two-Stroke Operation

FIGS. 5, 5A to 5D, and 6 represent schematic illustrations of camshaft-driven two-mode engine valve operation suitable for use in the air-hybrid engine of the present invention. The system is capable to operate an engine valve in two different activating modes, primary and auxiliary. In primary mode, the engine valve opens once every camshaft revolution for a relatively long period of time—usually slightly longer than the duration of the engine piston stroke. This mode of valve operation is used during the conventional four-stroke internal-combustion mode of the engine operation. In auxiliary activating mode, the engine valve opens twice during each camshaft revolution for relatively short periods of time. This mode of valve operation is used during the auxiliary mode of the engine operation.

FIG. 5 shows a double-input activator. A camshaft 310 rotates with half the crankshaft speed. It has three cam lobes, a primary cam lobe 312 and two auxiliary cam lobes, 314 and 316, for each engine valve. A more detailed description of the camshaft was given in the previous section.

Rotation of camshaft 310 controls the motion of an engine valve 324 by operating an activator 311 that can apply a valve-opening force to a valve tappet 326. A valve spring 328 provides a valve-closing force. Activator 311 has three main moving parts: a first input member 330, a second input member 332, and an output member 334. First input member 330 is driven by cam lobe 312. Second input member 332 is driven by cam lobes 314 and 316. Output member 334 drives engine valve 324. A more detailed description of the activator and its hydraulic system was given in the previous section.

The hydraulic path of fluid through activator 311 is divided into two branches: an upper branch 376 and a lower branch 378. Upper branch 376 includes line 366, inlet port 340, first chamber 352 (FIG. 6), outlet port 344, line 362, and solenoid valve 358. Lower branch 378 includes line 368, inlet port 342, second chamber 354 (FIG. 6), outlet port 346, line 363, and solenoid valve 360. Solenoid valves 358 and 360 are contained in controller 356.

Control system 382 can selectively open and close solenoid valves 358 and 360 in controller 356. This controls the flow of fluid through activator 311 and sets controller 356 into one of three control modes—a primary control mode, an auxiliary control mode, and a neutral control mode. If controller 356 operates in the primary control mode (as shown in FIG. 5), solenoid valve 358 is open, and solenoid valve 360 is closed. In that case, the fluid flows through upper branch 376, and there is no flow through lower branch 378, because line 363 is dead-ended at solenoid valve 360. If, on the other hand, controller 356 operates in the auxiliary control mode, solenoid valve 358 is closed and solenoid valve 360 is open (as shown in FIG. 5C). In that case, the fluid flows through lower branch 378, and there is no flow through upper branch 376, because line 362 is dead-ended at solenoid valve 358. If both solenoid valves 358 and 360 are open (as shown in FIG. 5D), the fluid flows through both upper branch 376 and lower branch 378. This is the neutral control mode.

To operate the engine in the conventional four-stroke internal-combustion mode, control system 382 keeps solenoid valve 358 open and solenoid 360 closed. In that case, primary cam lobe 312 is activated, and auxiliary cam lobes 314 and 316 are deactivated. Fluid can freely flow into and out of first chamber 352, and motion of second input member 332, driven by auxiliary cam lobes 314 and 316, has no effect on output member 334. On the other hand, fluid in second chamber 354 is trapped there, and motion of first input member 330, driven by primary cam lobe 312, is transmitted, through the trapped fluid, to output member 334 that drives engine valve 324. As a result, the motion of engine valve 324 is determined by the shape of primary cam lobe 312. Engine valve 324 opens once every camshaft 310 revolution, with duration and timing of its opening determined by primary cam lobe 312.

To operate the engine in the auxiliary mode, control system 382 keeps solenoid valve 358 closed and solenoid 360 open. In that case, primary cam lobe 312 is deactivated, and auxiliary cam lobes 314 and 316 are activated. Fluid can freely flow into and out of second chamber 354, and motion of first input member 330, driven by primary cam lobe 312, has no effect on output member 334. On the other hand, fluid in first chamber 352 is trapped there, and motion of second input member 332, driven by auxiliary cam lobes 314 and 316, is transmitted, through the trapped fluid, to output member 334 that drives engine valve 324. As a result, the motion of engine valve 324 is determined by shape of auxiliary cam lobes 314 and 316. Engine valve 324 opens twice every camshaft 310 revolution, with duration and timing of its opening determined by auxiliary cam lobes 314 and 316.

If both solenoid valves, 358 and 360, are open, fluid is free to flow through both upper branch 376 and lower branch 378. In that case, all cam lobes, primary and auxiliary, are deactivated, neither motion of first input member 330 nor motion of second input member 332 affects output member 334, and engine valve 324 remains closed.

In a multicylinder engine, two solenoid valves can control operation of all activators and all engine valves in the entire engine.

The above description of operation represents a generic case. In case of engine 10 (FIG. 1), operation of camshafts 70 and 80, activators 72 and 82, valves 20 and 22, controller 101, and control system 90 is the same as operation of camshaft 310, activator 311, valve 324, controller 356, and control system 382, respectively, in FIGS. 5, 5A to 5D, and 6.

Operation of the triple-input and single-input activators (FIGS. 7 and 9) is very similar to the above-described operation of the double-input activator and does not require an additional explanation.

3. Varying the Valve Event Duration

To avoid excessive pumping losses, during operation in the auxiliary mode, sudden changes of pressure during valve opening should be eliminated or minimized. For this, the cylinder air charge should be compressed to a pressure that is substantially equal to the air-reservoir pressure when the cylinder becomes connected to the air reservoir, and it should be expanded to a pressure that is substantially equal to atmospheric pressure when the cylinder becomes connected to outside atmosphere. Since the air-reservoir pressure is variable, the compression and expansion ratios must be variable too.

In a thermodynamic cycle, in which the compression and expansion ratios are equal, the values of the compression and expansion ratios are determined by the ratio of volume inducted into the cylinder to the volume displaced from the cylinder. Therefore, to vary the compression and expansion ratios, the volumes of air inducted into and displaced from the cylinder must be independently varied. For this, a variable control of valve event duration, expressed as a fraction of the piston stroke, is needed. Camshaft phase shifters are used for this purpose in the method and system of the present invention.

A camshaft phase shifter can be very effective in varying the timing of valve opening. However, it is not very effective for varying the valve event duration in a conventional engine, where the usual duration of the event is longer than the duration of the piston stroke. The situation is different, however, if the valve event duration is significantly shorter than the duration of the piston stroke, as is the case in the auxiliary mode of the engine operation. In that case, a phase shifter can vary the valve event duration very effectively.

Figure 10:
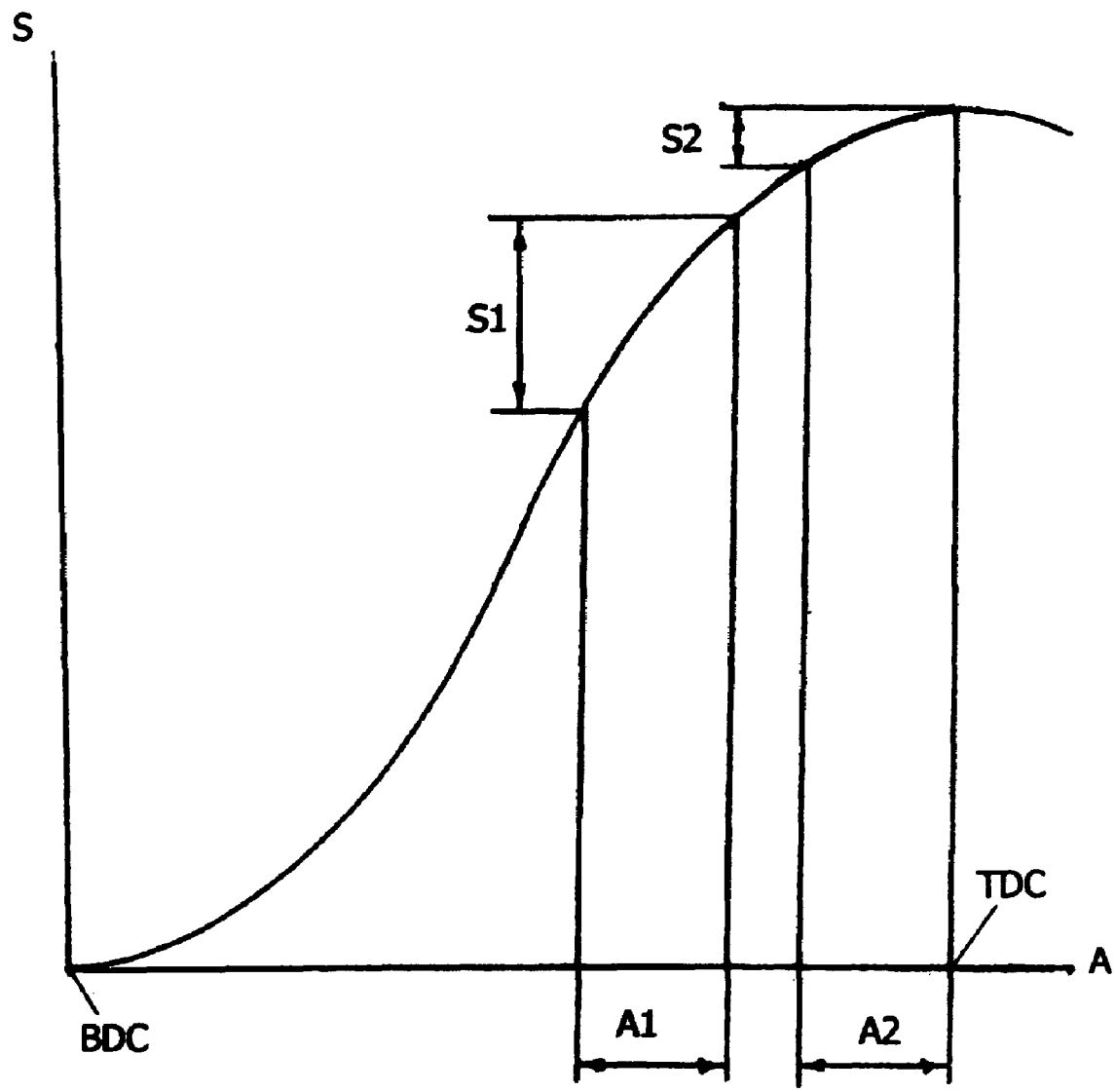
FIG. 10 is a piston stroke S vs. crankshaft angle A diagram.

The method of varying the compression and expansion ratios, in the engine of present invention, takes advantage of the fact that relationship between piston motion and crankshaft rotation is a non-linear one. FIG. 10 is a piston stroke S vs. crankshaft angle A diagram. It illustrates two short valve opening events of equal duration in crankshaft degrees (A1=A2). It is clear from the diagram that, although the valve opening event duration in crankshaft degrees remains constant (A1=A2), the event duration expressed as a fraction of the piston stroke, depends on where the event is relative to the top-dead-center (TDC) or relative to the bottom-dead-center (BDC). Moving the valve event closer to or farther away from the TDC (or BDC) reduces or increases, respectively, the corresponding fraction of the piston stroke (S1 is not equal to S2). This varies the volume of air inducted into or displaced from the cylinder during the valve opening event.

The top-dead-center (TDC) is the piston position at which the volume of the cylinder is the smallest and the direction of piston motion is reversed. The bottom-dead-center (BDC) is the piston position at which the volume of the cylinder is the greatest and the direction of piston motion is reversed.

Figure 11:
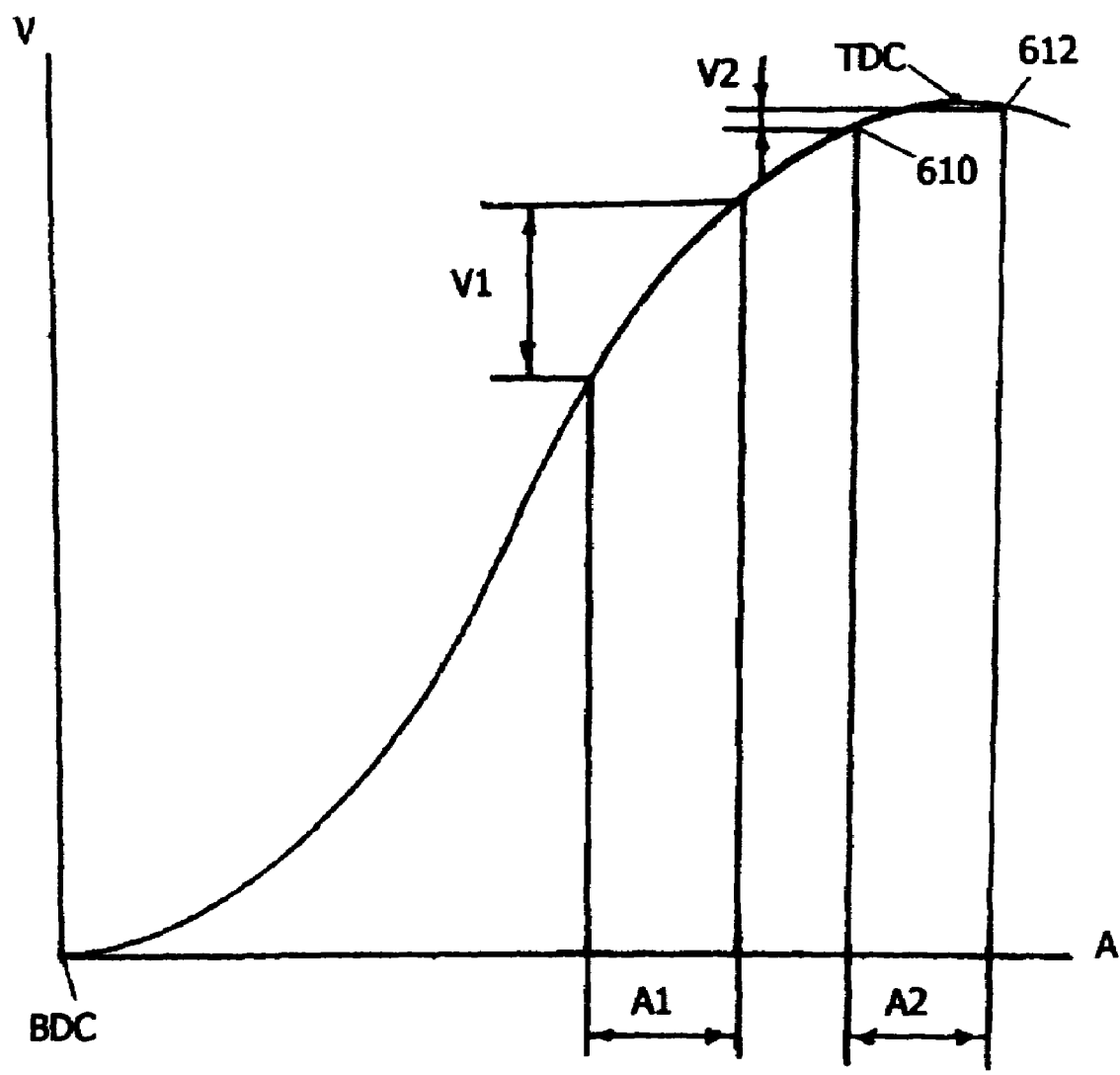
FIG. 11 is a diagram of the volume V displaced by the piston as a function of the crankshaft angle A.

The above effect is even greater if the beginning and the end of the event are on opposite sides of the TDC (or BDC). This is illustrated in FIG. 11 that shows the diagram of the volume V displaced by the piston as a function of the crankshaft angle A. It illustrates two short valve opening events of equal duration in crankshaft degrees (A1=A2). In valve event A2, the beginning of the event, at a point 610, is before TDC, but the end of the event, at a point 612, is after TDC. Between the beginning of the event at point 610 and the TDC, air is displaced from the cylinder. Between the TDC and the end of the event at point 612, air returns into the cylinder. As a result, the net volume V2, displaced from the cylinder, is substantially smaller than the volume V1, because V2 is the difference between the volume of air displaced from the cylinder and the volume of air returned into the cylinder. Moving the timing of the valve event A2 farther to the right in the diagram can reduce the net volume V2 to zero, and can even turn it into a net flow into the cylinder.

Engine 10 (FIG. 1) has two camshafts, 70 and 80 (FIG. 1), each with its own phase shifter, 92 or 94 (FIG. 2), respectively. While one of the camshafts controls flow of air into cylinder 12 (and into other engine cylinders), the other camshaft controls flow of air out of the cylinders. Independent control of the timing of the air induction and of the air discharge permits independent control of the volume of air inducted into the cylinder and of the volume discharged from the cylinder. Varying the ratio of the volume inducted to the volume discharged varies the compression ratio (or the expansion ratio), thus varying the cylinder pressure at the end of compression (or expansion).

Figure 12:
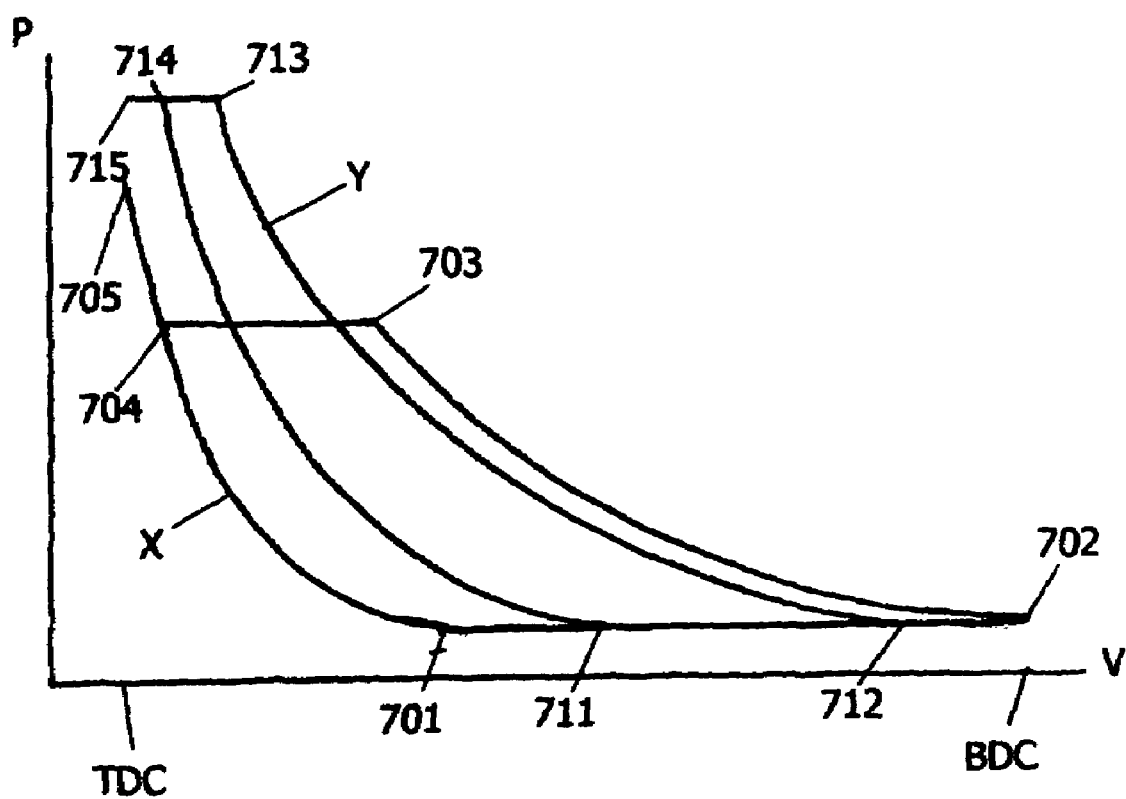
FIG. 12 illustrates how the change in compression ratio can be performed when the engine operates as a compressor.

FIG. 12 illustrates how the change in compression ratio can be performed when the engine operates as a compressor. It shows two superimposed pressure-volume diagrams, X and Y.

In the diagram X, the intake of air begins at a point 701 and ends at a point 702, which is at BDC. The net volume of air inducted into the cylinder is the volume of the cylinder at point 702 less the volume of the cylinder at point 701. From point 702 to a point 703, the air is compressed. The discharge into the air reservoir begins at point 703 and ends at a point 704, which is shortly before the TDC. The net volume of air discharged from the cylinder is the volume of the cylinder at point 703 less the volume of the cylinder at point 704. From point 704 to a point 705, which is at TDC, additional compression takes place. From point 705 to point 701, expansion of residual charge takes place.

In the diagram Y, the intake event is shifted to the right, towards the BDC, and the end of the intake moves past the BDC. The intake begins at point 711 and ends at point 712, which is past the BDC. From point 711 to BDC, air is inducted into the cylinder. From BDC to point 712, air is displaced from the cylinder. The net volume of air inducted into the cylinder is the volume of the cylinder at point 712 less the volume of the cylinder at point 711. From point 712 to a point 713, the air is compressed.

The discharge event, in the diagram Y, is shifted to the left, towards the TDC, and the end of the discharge moves past the TDC. The discharge begins at point 713 and ends at point 714, which is past the TDC. From point 713 to a point 715, which is at TDC, air is discharged from the cylinder. From point 715, to point 714, air flows back into the cylinder. The net volume of air discharged from the cylinder is the volume of the cylinder at point 713 less the volume of the cylinder at point 714. From point 714 to point 711, expansion of residual charge takes place.

The ratio of the inducted volume to the discharged volume is greater in the cycle Y than in the cycle X. Thanks to an increase in the ratio of the inducted volume to the discharged volume, the compression ratio in cycle Y is greater than that in cycle X.

The engine control system is programmed to control the timing of the valve events as a function of the required torque and as a function of the air-reservoir pressure. To avoid excessive pumping loss, the timing is selected so that sudden changes in cylinder pressure are avoided or minimized.

When an engine cylinder becomes connected to the air reservoir or to outside atmosphere, the sudden flow of gas into or out of the cylinder causes changes in the gas pressure and temperature. The correlation between the gas pressure and temperature changes, and an additional amount of energy, contained in the gas, becomes unavailable to perform useful work. This phenomenon is known as an increase in the engine pumping loss, and it reduces the thermodynamic cycle efficiency. To reduce the pumping loss and improve the cycle efficiency, the pressure differential between the cylinder chamber and the air reservoir, or between the cylinder chamber and outside atmosphere, at the beginning of the valve opening event, should be minimized. This requires varying the compression ratio and the expansion ratio as a function of the pressure in the air reservoir.

In a theoretical ideal cycle, an instantaneous opening and closing of valves and an instantaneous filling and emptying of the cylinder chamber is assumed. In such cycle, the best result is achieved if, during compression, the air is compressed to pressure equal to pressure in the air reservoir. During expansion, the air should be expanded to atmospheric pressure. However, in a real-life cycle, neither valve operation nor cylinder filling and emptying is instantaneous. Experience shows that, to minimize the pumping loss in such cycle, connection between the cylinder chamber and the air reservoir should be initiated shortly before the cylinder pressure becomes equal to the air reservoir pressure, and connection between the cylinder chamber and the outside atmosphere should be initiated shortly before the cylinder pressure drops to atmospheric pressure. Those differences in pressure are small, but real. Therefore, it can be stated that, in a real-life auxiliary cycle, the air received from outside atmosphere should be compressed to pressure that is substantially equal to pressure in the air reservoir, and the air received from air reservoir should be expanded to pressure that is substantially equal to pressure in outside atmosphere. The timing of each valve opening that provides for optimum cycle efficiency is established by testing the engine. The data produced by testing is stored in the control system software.

The engine control system monitors the pressure in the air reservoir and controls the air compression and expansion, by controlling the timing of the valve events in accordance with the data contained in its software, so that the pumping loss is minimized and the thermodynamic cycle efficiency is optimized.

In engine 10 (FIGS. 1 and 2), control system 90 receives information on pressure in air reservoir 56 from pressure sensor 55. Control system 90 controls the timing of valves 20 and 22 by controlling phase shifters 92 and 94, respectively. Phase shifters 92 and 94 vary the timing of camshafts 70 and 80, respectively, relative to piston 14 position. In engine 110 (FIG. 3), phase shifters 192 and 194 vary the timing of camshafts 170 and 180, respectively.

Ability to vary the volume of air received into the engine by varying the timing of the engine valves operation can be used to control the engine torque during operation in the auxiliary mode. Changing the volume of the air charge received into the cylinder chamber changes the mass of that charge. Varying the mass of the air charge varies the positive or negative engine torque produced during propulsion or braking, respectively. Control system responds to the driver's demand for specific propulsion or braking torque, in auxiliary mode, by controlling the engine valve timing in accordance with a program and data contained in its software.

Figure 13:
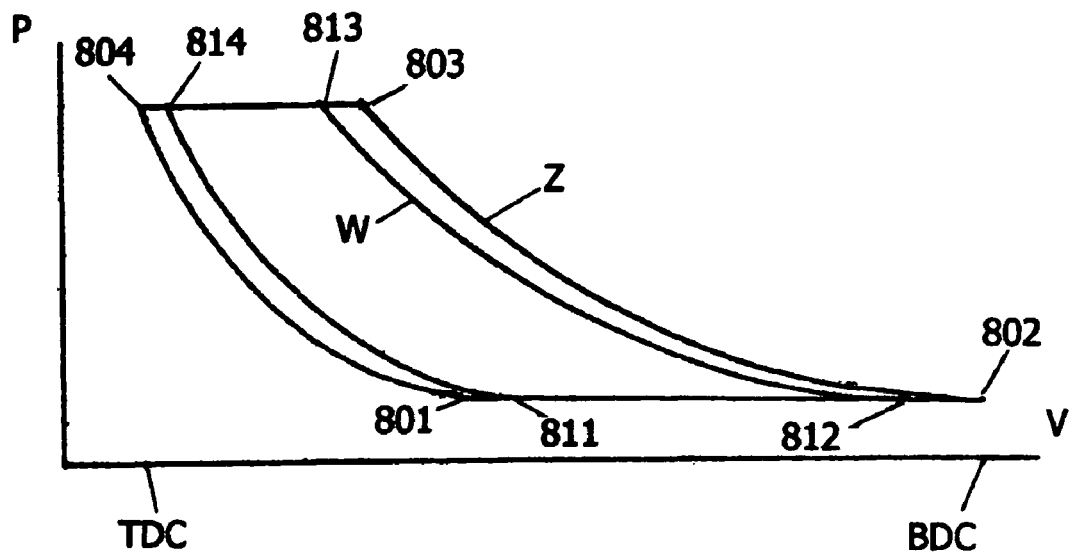
FIG. 13 illustrates how the change in engine torque can be performed by varying valve timing when the engine operates as a compressor.

FIG. 13 illustrates how the change in engine torque can be performed by varying valve timing when the engine operates as a compressor. It shows two superimposed pressure-volume diagrams, Z and W.

In the diagram Z, the intake of air begins at a point 801 and ends at a point 802, which is at BDC. The net volume of air inducted into the cylinder is the volume of the cylinder at point 802 less the volume of the cylinder at point 801. From point 802 to a point 803, the air is compressed. The discharge into the air reservoir begins at point 803 and ends at a point 804, which is at TDC. The net volume of air discharged from the cylinder is the volume of the cylinder at point 803 less the volume of the cylinder at point 804. From point 804 to point 801, expansion of residual charge takes place.

In the diagram W, the intake event is shifted to the right, towards the BDC. The beginning of intake moves to a point 811 and the end of the intake moves past BDC to a point 812. From point 811 to BDC, air is inducted into the cylinder. From BDC to point 812, air is displaced from the cylinder. The net volume of air inducted into the cylinder is the volume of the cylinder at point 812 less the volume of the cylinder at point 811. From point 812 to a point 813, the air is compressed.

The discharge event, in the diagram W, is shifted to the left, towards the TDC, and the end of the discharge moves past the TDC. The discharge begins at point 813 and ends at point 814, which is past the TDC. From point 813 to TDC, air is discharged from the cylinder. From TDC to point 814, air flows back into the cylinder. The net volume of air discharged from the cylinder is the volume of the cylinder at point 813 less the volume of the cylinder at point 814. From point 814 to point 811, expansion of residual charge takes place.

The timing of the valve events in diagrams Z and W is such that the volume of air inducted in cycle W is smaller than that in cycle Z, but the ratios of volume inducted to volume discharged in both cycles are equal. Therefore torque produced in cycle W is smaller than torque produced in cycle Z, but the compression ratios in both cycles are equal.

Another method of controlling the engine torque, in auxiliary mode, involves controlling the pressure of air received into the engine. Varying the pressure varies the density of the air, and this changes the mass of the air charge received into the cylinder chamber.

In engine 10 (FIG. 1), control system 90 can attenuate the pressure of air flowing into the engine from air reservoir 56 by controlling either flow restrictor 66 (if the air flows through duct 58) or flow restrictor 68 (if the air flows through duct 62). In engine 110 (FIG. 3), it is the flow restrictor 166 that is controlled. Controlled attenuation of the pressure of air coming from compressed air-reservoir 56 controls the torque in the air-motor operation. In the compressor mode, the pressure of air received from outside atmosphere can be controlled by throttling the inlet air using the air throttle that is an integral part of intake system 52 (FIG. 1). This controls the braking torque.

Figure 14:
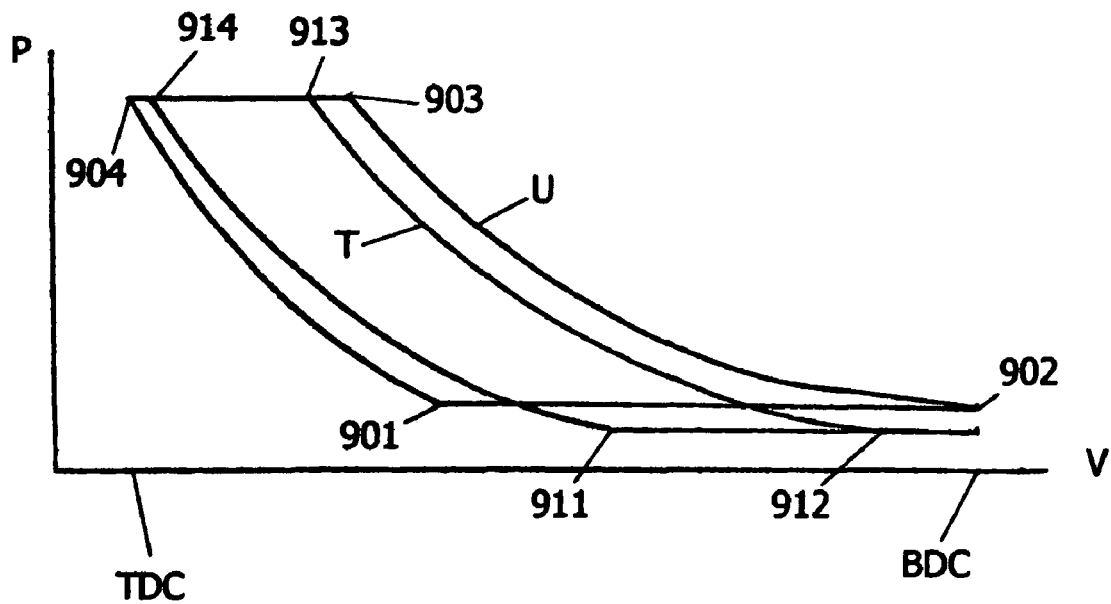
FIG. 14 illustrates how the change in engine torque can be performed by varying inlet pressure and valve timing when the engine operates as a compressor.

It is often convenient to combine inlet air pressure control with valve timing control. FIG. 14 illustrates how the change in engine torque can be performed by varying inlet pressure and valve timing when the engine operates as a compressor. It shows two superimposed pressure-volume diagrams, U and T.

In the diagram U, the intake of air begins at a point 901 and ends at a point 902, which is at BDC. The net volume of air inducted into the cylinder is the volume of the cylinder at point 902 less the volume of the cylinder at point 901. From point 902 to a point 903, the air is compressed. The discharge into the air reservoir begins at point 903 and ends at a point 904, which is at TDC. The net volume of air discharged from the cylinder is the volume of the cylinder at point 903 less the volume of the cylinder at point 904. From point 904 to point 901, expansion of residual charge takes place.

In the diagram T, the intake air is throttled to a lower pressure than in the diagram U, and the intake event is shifted to the right, towards the BDC. The beginning of intake moves to a point 911 and the end of the intake moves past BDC to a point 912. From point 911 to BDC, air is inducted into the cylinder. From BDC to point 912, air is displaced from the cylinder. The net volume of air inducted into the cylinder is the volume of the cylinder at point 912 less the volume of the cylinder at point 911. The density of that intake charge is less than the density of the intake charge in the cycle U. From point 912 to a point 913, the air is compressed.

The discharge event, in the diagram T, is shifted to the left, towards the TDC, and the end of the discharge moves past the TDC. The discharge begins at point 913 and ends at point 914, which is past the TDC. From point 913 to TDC, air is discharged from the cylinder. From TDC to point 914, air flows back into the cylinder. The net volume of air discharged from the cylinder is the volume of the cylinder at point 913 less the volume of the cylinder at point 914. From point 914 to point 911, expansion of residual charge takes place.

The timing of the valve events in diagrams U and T is such that the mass of air inducted in cycle U is smaller than that in cycle T, because of smaller volume and lower density, but the pressure at the end of compression in cycle U is the same as in cycle T. Because of smaller mass, torque produced in cycle W is smaller than torque produced in cycle Z.

It should be noted that FIGS. 13 and 14 are just conceptual diagrams and are not drawn to scale.

4. Engine Operation

A. Primary Mode of Engine Operation

When engine 10 (FIGS. 1 and 2) operates in the primary operational mode, first activator 72 and second activator 82 are set into primary activating mode, in which first valve 20 and second valve 22 are actuated by primary cam lobes 78 and 88, respectively. Each valve opens once every two crankshaft revolutions, each time connecting cylinder 16 to first manifold 40 or to second manifold 46, respectively. First switching box 48 connects first manifold 40 to intake system 52, and second switching box 50 connects second manifold 46 to exhaust system 54. The engine operates as a conventional four stroke internal-combustion engine.

Operation of engine 110 (FIG. 3) is similar to that of engine 10, but the method of connecting the cylinders to the intake and exhaust systems is different. In primary mode, first activator 172 is set into primary activating mode, in which first valve 120 is actuated by primary cam lobe 178. First valve 120 opens once every two crankshaft revolutions, each time connecting cylinder 116 to intake system 152. Second activator 182 activates second valve 122 that opens once every two crankshaft revolutions, each time connecting cylinder 116 to exhaust system 154. Third activator 183 deactivates third valve 124. The engine operates as a conventional four stroke internal-combustion engine.

B. Auxiliary Mode of Engine Operation

When engine 10 (FIGS. 1 and 2) operates in any two-stroke auxiliary operational mode, first activator 72 and second activator 82 are set into auxiliary activating mode, in which first valve 20 and second valve 22 are actuated by auxiliary cam lobes 79 and 89, respectively. Each valve opens once every crankshaft revolution, each time connecting cylinder 16 to first manifold 40 or to second manifold 46, respectively.

(a) Compressor Operation

During braking, first switching box 48 connects first manifold 40 to intake system 52, and second switching box 50 connects second manifold 46 to air reservoir 56. Fuel-injection system is deactivated. Phase shifters 92 and 94 set the timing of camshafts 70 and 80, respectively, so that cylinder 16 receives air from intake system 52, during volume-increasing stroke of piston 14, and, after compression, discharges air into air reservoir 56 during volume-decreasing stroke of piston 14. The engine operates as a two-stroke compressor, driven by the vehicle momentum, receiving air from outside atmosphere, compressing it and displacing it into air reservoir 56 for storage. The negative work of air compression decelerates the vehicle.

(b) Air-Motor Operation

During acceleration and, sometimes, during cruise, first switching box 48 connects first manifold 40 to air reservoir 56, and second switching box 50 connects second manifold 46 to exhaust system 54. Fuel-injection system is deactivated. Phase shifters 92 and 94 set the timing of camshafts 70 and 80, respectively, so that cylinder 16 receives compressed air from air reservoir 56, during volume-increasing stroke of piston 14, and, after expansion, discharges air into exhaust system 54 during volume-decreasing stroke of piston 14. The engine operates as a two-stroke air motor receiving air from air reservoir 56, expanding it and displacing it into outside atmosphere. In this way, energy of compressed air, accumulated during braking, is used to propel the vehicle.

In another alternative of the air-motor operation, second switching box 50 may connect second manifold 46 to air reservoir 56, while first switching box 48 connects first manifold 40 to intake system 52. In that case, air, after expansion, is expelled into intake system 52.

(c) Air-Power Assist.

In another version of the auxiliary operational mode, engine 10 can operate as an internal-combustion engine that is further assisted by compressed air from air reservoir 56. That is the air-power-assisted cycle (APA). In the APA mode, the engine receives compressed air from the air reservoir and uses it for combustion. Fuel is added to the air either before or after the air enters the cylinders. The potential energy contained in compressed air supplements the energy released in fuel combustion, and both fuel and compressed-air energy are used to propel the vehicle. Both two-stroke and four-stroke cycles can be used in the APA mode.

TWO-STROKE APA—When engine 10 (FIGS. 1 and 2) operates in the two-stroke APA cycle, first switching box 48 connects first manifold 40 to air reservoir 56, and second switching box 50 connects second manifold 46 to exhaust system 54. Phase shifters 92 and 94 set the timing of camshafts 70 and 80, respectively, so that combustion gas is expelled from cylinder 16 into exhaust system 54 during a first part of piston 16 volume-decreasing stroke, and a fresh compressed-air charge is received into cylinder 16 during a second part of piston 14 volume-decreasing stroke. Combustion and gas expansion take place during the volume-increasing stroke.

FOUR-STROKE APA—The four-stroke APA mode differs from other auxiliary modes in that it requires opening of the engine valves only once every two crankshaft revolutions. If it is desirable for engine 10 (FIGS. 1 and 2) to be able to operate both in two-stroke and in four-stroke APA modes, the system must be able to connect first valve 20 to air reservoir 56 alternatively once every crankshaft revolution (for two-stroke APA) or once every two crankshaft revolutions (for four-stroke APA). For this, compound cam lobe 77 and activator 72, in engine 10, should be designed as shown in FIG. 7, where there are two types of auxiliary cam lobes: first auxiliary cam lobes that can open an engine valve once every camshaft revolution, and second auxiliary cam lobes that can open the same valve twice every camshaft revolution. Accordingly, there are two auxiliary activating sub-modes: a first auxiliary activating sub-mode, in which only first auxiliary cam lobes are activated (for four-stroke APA), and a second auxiliary activating sub-mode, in which only second auxiliary cam lobes are activated (for two-stroke APA). When engine 10 (FIGS. 1 and 2) operates in the four-stroke APA operational mode, first activator 72 and second activator 82 are set into first auxiliary activating sub-mode and primary activating mode, respectively. First valve 20 opens once every two crankshaft revolution, each time connecting cylinder 16 to first manifold 40. Second valve 22 opens once every two crankshaft revolution, each time connecting cylinder 16 to second manifold 46. First switching box 48 connects first manifold 40 to air reservoir 56, and second switching box 50 connects second manifold 46 to exhaust system 54. Phase shifters 92 and 94 set the timing of camshafts 70 and 80, respectively, so that a compressed-air charge is received from air reservoir 56 into cylinder 16 during a first part of piston 14 first volume-increasing stroke, and combustion gas is expelled from cylinder 16 into exhaust system 54 during piston 14 second volume-decreasing stroke. Compressed-air expansion takes place during a second part of first volume-increasing stroke. Air compression takes place during first volume-decreasing stroke. Combustion and gas expansion take place during second volume-increasing stroke.

In another alternative of the four-stroke APA, the need for the triple-input activator can be eliminated if the engine valves can be selectively deactivated every other crankshaft revolution. This can be accomplished by switching the activators into the neutral activating mode every other crankshaft revolution.

(d) Engine 110 (FIG. 3)

Operation of engine 110 (FIG. 3) in auxiliary mode is similar to that of engine 10, but the method of connecting the cylinders to the intake and exhaust systems is different. In compressor operation, first activator 172 is set into auxiliary activating mode, in which first valve 120 is actuated by auxiliary cam lobe 179. First valve 120 opens once every crankshaft revolution, each time connecting cylinder 116 to intake system 152. Third activator 183 activates third valve 124 that opens once every crankshaft revolution, each time connecting cylinder 116 to air reservoir 156. Second activator 182 deactivates second valve 122. Phase shifters 192 and 194 set the timing of camshafts 170 and 180, respectively, so that cylinder 116 receives air from intake system 152, during volume-increasing stroke of the engine piston, and, after compression, discharges air into air reservoir 156 during volume-decreasing stroke of the engine piston. In other respects, engine 110 operation in compressor mode is the same as that of engine 10.

In air-motor operation, third activator 183 activates third valve 124 that opens once every crankshaft revolution, each time connecting cylinder 116 to air reservoir 156. First activator 172 is set into auxiliary activating mode, in which first valve 120 is actuated by auxiliary cam lobe 179 and first valve 120 opens once every crankshaft revolution, each time connecting cylinder 116 to intake system 152. Second activator 182 deactivates second valve 122. Phase shifters 192 and 194 set the timing of camshafts 170 and 180, respectively, so that cylinder 116 receives compressed air from air reservoir 156, during volume-increasing stroke of the engine piston, and, after expansion, discharges air into intake system 152 during volume-decreasing stroke of the engine piston. In other respects, engine 110 operation in air-motor mode is the same as that of engine 10.

Engine 110 is not suitable for the air-power-assist operation.

Figure 15A:
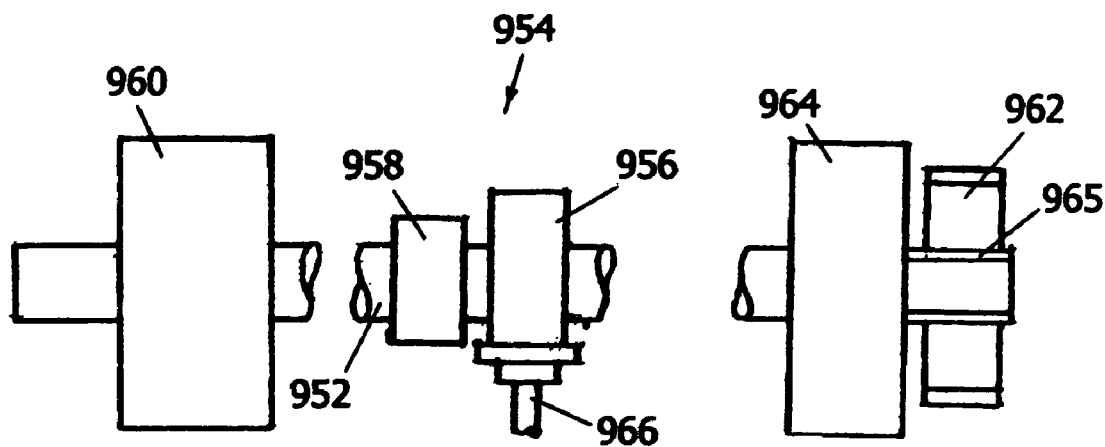
FIGS. 15A and 15B provide schematic illustration of a camshaft and actuator arrangement providing for an axial shift of the camshaft.
Figure 15B:
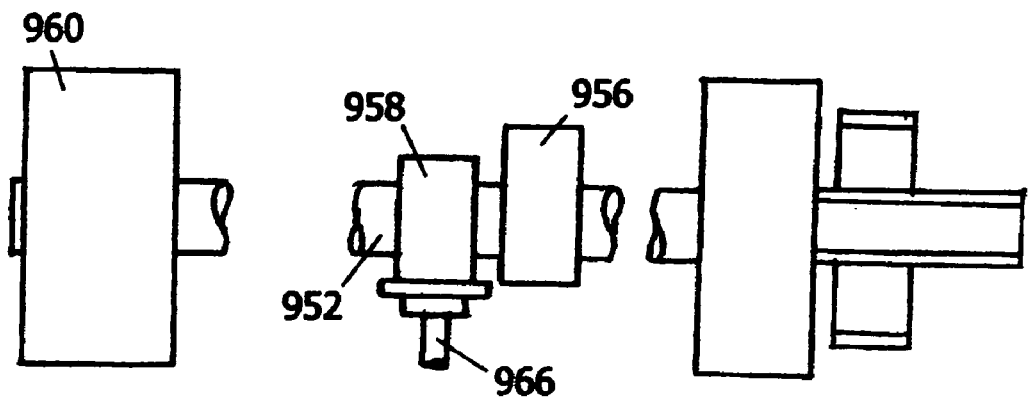

The above described preferred embodiment employs multi-input cam lobe activators for switching from one mode of engine operation to another. Those skilled in art will recognize in view of this disclosure that other methods of switching engine valve operation from one cam lobe to another can be used. For example, an axial shift of the camshaft can be used to effectuate such switch. FIGS. 15A and 15B provide schematic illustration of a camshaft and actuator arrangement providing for an axial shift of the camshaft. A camshaft 952 has at a compound cam lobe 954 that includes a primary cam lobe 956 and an auxiliary cam lobe 958. An actuator 960 can effectuate an axial shift of camshaft 952 under the control of the engine control system (not shown). A sprocket 962 rotates camshaft 952 through splines 965 that allow axial motion of camshaft 952 relative to sprocket 962, which is prevented from moving in axial direction (not shown). A similar arrangement allows axial motion of camshaft 952 relative to actuator 960 and a phase shifter 964. In FIG. 15A, primary cam lobe 956 operates a valve 966, and auxiliary cam lobe 958 is inactive. In FIG. 15B, actuator 960 has shifted camshaft 952 to the right. As a result, auxiliary cam lobe 958 operates valve 966, and primary cam lobe 956 is inactive.

In the above described preferred embodiment, each engine cylinder delivers compressed air directly to the air reservoir during compressor operation, and each cylinder receives compressed air directly from the air reservoir during the air-motor and the air-power-assist operation. Those skilled in art will appreciate in view of this disclosure that other methods of air compression and delivery into and induction from the air reservoir can be implemented without deviating from the basic concept, according to the present invention. For example, some of the cylinders may receive atmospheric air, subject it to a first stage of compression and displace it into other cylinders, where that air is subjected to a second stage of compression and displaced into the air reservoir. The basic principle of receiving atmospheric air into the engine, compressing it, and displacing it into the air reservoir remains unchanged. A corresponding two-stage air-expansion process is used during the air motor and during the air-power-assist operations. Such two-stage compression and expansion requires a much smaller air reservoir.

While certain embodiments of the present invention have been described in detail, those familiar with the art to which this invention relates will recognize various alternative designs and embodiments for practicing this invention as defined by the following claims.

I claim:

1. A method of operating a wheeled vehicle, said method comprising the steps of:
    (a) providing an engine mounted in said vehicle and coupled to at least one vehicle wheel for its propulsion and braking, said engine including:
        (1) at least one cylinder,
        (2) a cylinder chamber within said at least one cylinder,
        (3) a head mounted to said at least one cylinder, and
        (4) a piston operatively engaging said at least one cylinder, with the piston to head and cylinder relationship being such that the volume of said cylinder chamber shrinks during a volume decreasing-stroke, when said piston moves towards said head, and expands during a volume increasing-stroke, when said piston moves away from said head,
    (b) providing an air-reservoir means mounted in said vehicle for receiving, storage, and discharge of compressed air,
    (c) providing a control means for controlling the operation of said engine and said vehicle in response to driver's demands and in accordance with a control program incorporated in said control means,
    (d) providing a gas-exchange controlling means for connecting said engine to outside atmosphere and to said air-reservoir means, said gas-exchange controlling means including a valve means for accommodating gas flow into and out of said cylinder chamber, said valve means including a plurality of valves in each engine cylinder,
    (e) providing a camshaft means for operating said valve means, said camshaft means comprising a plurality of cam lobes including a set of primary cam lobes and a set of auxiliary cam lobes,
    (f) providing an activator means for selectively and alternatively activating and deactivating cam lobes selected from said plurality of cam lobes, and for selectively and alternatively setting operation of said valve means into a mode selected from a set of activating modes including:
        (1) a primary activating mode in which only primary cam lobes are activated, whereby only said primary cam lobes operate said valve means, and
        (2) an auxiliary activating mode in which only selected auxiliary cam lobes are activated, whereby only said selected auxiliary cam lobes operate said valve means, said activator means comprising a plurality of activators,
    (g) providing a phase-shifter means for varying and setting phase relationship between said camshaft means and said engine crankshaft,
        whereby timing of opening of each of said plurality of valves relative to a reference position of said piston can be varied,
        whereby distance traveled by said piston during a valve opening event can be varied,
        whereby volume of air received into said cylinder chamber and volume of air displaced from said cylinder chamber can be varied,
        whereby ratio of volume of air received into said cylinder chamber to volume of air displaced from said cylinder chamber can be varied, whereby compression ratio of air compressed in said cylinder chamber during said volume-decreasing stroke can be varied, and whereby expansion ratio of air expanded in said cylinder chamber during said volume-increasing stroke can be varied, (h) selectively and alternatively operating said engine in a mode selected from a set of operational modes including a primary operational mode wherein said engine operates as a conventional internal-combustion engine, and an auxiliary operational mode, said auxiliary operational mode comprising the steps of:

(1) operating said engine as a compressor driven by vehicle momentum during said vehicle braking, said compressor receiving air from outside atmosphere, compressing said air and displacing it into said air-reservoir means for storage therein, and (2) operating said engine as a prime mover during said vehicle propulsion, said prime mover receiving compressed air from said air-reservoir means and using energy of said compressed air for vehicle propulsion, (i) operating said valve means in said primary activating mode when said engine operates in said primary operational mode, and operating said valve means in said auxiliary activating mode when said engine operates in said auxiliary operational mode, and (j) varying timing of opening of said plurality of valves relative to a reference position of said piston in accordance with said control program incorporated in said control means, whereby air compression and air expansion in said cylinder chamber are controlled as required to satisfy driver's demands and in accordance with said control program.

2. The method of claim 1 wherein said camshaft means comprises at least one compound cam lobe, each compound cam lobe operating an activator and each including at least one primary cam lobe and at least one auxiliary cam lobe.

3. The method of claim 2 wherein the shape of said primary cam lobe is such that it opens an engine valve once during each camshaft revolution when operated in said primary activating mode, and the shape of said auxiliary cam lobe is such that it opens said engine valve at least twice during each camshaft revolution when operated in said auxiliary activating mode, whereby said engine can selectively and alternatively operate in a four-stroke cycle and in a two-stroke cycle.

4. The method of claim 2 wherein said activator means comprises:

(a) at least one double-input activator, each activator interposed between said compound cam lobe and at least one valve, said activator including:

(1) a housing stationary relative to said engine, (2) a plurality of movable input members within said housing, said plurality of movable input members including at least one primary input member actuatable by said at least one primary cam lobe, and at least one auxiliary input member actuatable by said at least one auxiliary cam lobe, (3) an output means for actuating said at least one valve, said output means including at least one movable output member within said housing, (4) at least one primary chamber filled with liquid between said at least one primary input member and said at least one output member, the arrangement of said at least one primary chamber with said at least one primary input member and said at least one output member being such that:

(A) motion of said at least one primary input member can be transmitted to said at least one output member and motion of said at least one output member can be transmitted to said at least one primary input member through said liquid when said liquid is trapped inside said at least one primary chamber, and (B)) motion of said at least one primary input member can not be transmitted to said at least one output member and motion of said at least one output member can not be transmitted to said at least one primary input member through said liquid when said liquid is not trapped inside said at least one primary chamber, and (5) at least one auxiliary chamber filled with liquid between said at least one auxiliary input member and said at least one output member, the arrangement of said at least one auxiliary chamber with said at least one auxiliary input member and said at least one output member being such that:

(A) motion of said at least one auxiliary input member can be transmitted to said at least one output member and motion of said at least one output member can be transmitted to said at least one auxiliary input member through said liquid when said liquid is trapped inside said at least one auxiliary chamber, and (B)) motion of said at least one auxiliary input member can not be transmitted to said at least one output member and motion of said at least one output member can not be transmitted to said at least one auxiliary input member through said liquid when said liquid is not trapped inside said at least one auxiliary chamber, (b) a source of pressurized liquid and means for flowing said pressurized liquid through said at least one double-input activator, and (c) a flow control means for controlling flow of said pressurized liquid through said at least one double-input activator, said flow control means selectively and alternatively operating in a control mode selected from a set of control modes including:

(1) a first control mode allowing flow of said pressurized liquid into and out of said at least one auxiliary chamber and preventing flow of said pressurized liquid into and out of said at least one primary chamber, whereby said liquid is not trapped inside said at least one auxiliary chamber and is trapped inside said at least one primary chamber, and whereby said at least one auxiliary cam lobe is deactivated and said at least one primary cam lobe is activated, and (2) a second control mode allowing flow of said pressurized liquid into and out of said at least one primary chamber and preventing flow of said pressurized liquid into and out of said at least one auxiliary chamber, whereby said liquid is not trapped inside said at least one primary chamber and is trapped inside said at least one auxiliary chamber, and whereby said at least one primary cam lobe is deactivated and said at least one auxiliary cam lobe is activated, whereby motion of said at least one output member is determined by motion of said at least one primary input member and is not affected by motion of said at least one auxiliary input member when said flow control means operates in said first control mode, whereby motion of said at least one output member is determined by motion of said at least one auxiliary input member and is not affected by motion of said at least one primary input member when said flow control means operates in said second control mode, whereby motion of said at least one valve is determined by shape of said at least one primary cam lobe and said at least one valve operates in said primary activating mode when said flow control means operates in said first control mode, and whereby motion of said at least one valve is determined by shape of said at least one auxiliary cam lobe and said at least one valve operates in said auxiliary activating mode when said flow control means operates in said second control mode.

5. The method of claim 1 wherein:
(a) said set of auxiliary cam lobes comprises a plurality of differently shaped auxiliary cam lobes including at least one first auxiliary cam lobe and at least one second auxiliary cam lobe, and
(b) said auxiliary activating mode comprises a plurality of auxiliary activating sub-modes including:
    (1) a first auxiliary activating sub-mode in which only first auxiliary cam lobes are activated, and
    (2) a second auxiliary activating sub-mode in which only second auxiliary cam lobes are activated,
whereby differently shaped auxiliary cam lobes can be used during operation in different variants of said auxiliary operational mode.

6. The method of claim 5 wherein the shape of said first auxiliary cam lobe is such that it opens an engine valve once during each camshaft revolution when operated in said first auxiliary activating sub-mode, and the shape of said second auxiliary cam lobe is such that it opens said engine valve at least twice during each camshaft revolution when operated in said second auxiliary activating sub-mode, whereby said engine can selectively and alternatively operate in a four-stroke cycle and in a two-stroke cycle during operation in said auxiliary operational mode.

7. The method of claim 5 wherein said camshaft means comprises at least one compound cam lobe, each compound cam lobe operating an activator and each including at least one primary cam lobe, at least one first auxiliary cam lobe, and at least one second auxiliary cam lobe.

8. The method of claim 7 wherein said activator means comprises:
(a) at least one triple-input activator, each activator interposed between said compound cam lobe and at least one valve, said activator including:
    (1) a housing stationary relative to said engine,
    (2) a plurality of movable input members within said housing, said plurality of movable input members including at least one primary input member actuatable by said at least one primary cam lobe, at least one first auxiliary input member actuatable by said at least one first auxiliary cam lobe, and at least one second auxiliary input member actuatable by said at least one second auxiliary cam lobe,
    (3) an output means for actuating said at least one valve, said output means including at least one movable output member within said housing,
    (4) at least one primary chamber filled with liquid between said at least one primary input member and said at least one output member, the arrangement of said at least one primary chamber with said at least one primary input member and said at least one output member being such that:
        (A) motion of said at least one primary input member can be transmitted to said at least one output member and motion of said at least one output member can be transmitted to said at least one primary input member through said liquid when said liquid is trapped inside said at least one primary chamber, and
        (B)) motion of said at least one primary input member can not be transmitted to said at least one output member and motion of said at least one output member can not be transmitted to said at least one primary input member through said liquid when said liquid is not trapped inside said at least one primary chamber,
    (5) at least one first auxiliary chamber filled with liquid between said at least one first auxiliary input member and said at least one output member, the arrangement of said at least one first auxiliary chamber with said at least one first auxiliary input member and said at least one output member being such that:
        (A) motion of said at least one first auxiliary input member can be transmitted to said at least one output member and motion of said at least one output member can be transmitted to said at least one first auxiliary input member through said liquid when said liquid is trapped inside said at least one first auxiliary chamber, and
        (B) motion of said at least one first auxiliary input member can not be transmitted to said at least one output member and motion of said at least one output member can not be transmitted to said at least one first auxiliary input member through said liquid when said liquid is not trapped inside said at least one first auxiliary chamber,
    and
    (6) at least one second auxiliary chamber filled with liquid between said at least one second auxiliary input member and said at least one output member, the arrangement of said at least one second auxiliary chamber with said at least one secondary auxiliary input member and said at least one output member being such that:
        (A) motion of said at least one second auxiliary input member can be transmitted to said at least one output member and motion of said at least one output member can be transmitted to said at least one second auxiliary input member through said liquid when said liquid is trapped inside said at least one second auxiliary chamber, and
        (B) motion of said at least one second auxiliary input member can not be transmitted to said at least one output member and motion of said at least one output member can not be transmitted to said at least one second auxiliary input member through said liquid when said liquid is not trapped inside said at least one second auxiliary chamber,
(b) a source of pressurized liquid and means for flowing said pressurized liquid through said at least one triple-input activator, and
(c) a flow control means for controlling flow of said pressurized liquid through said at least one triple-input activator, said flow control means selectively and alternatively operating in a control mode selected from a set of control modes including:
    (1) a first control mode allowing flow of said pressurized liquid into and out of said at least one first auxiliary chamber and into and out of said at least one second auxiliary chamber, and preventing flow of said pressurized liquid into and out of said at least one primary chamber, whereby said liquid is not trapped inside said first and second auxiliary chambers and is trapped inside said at least one primary chamber, and whereby said at least one first auxiliary cam lobe and said at least one second auxiliary cam lobe are deactivated and said at least one primary cam lobe is activated, (2) a second control mode allowing flow of said pressurized liquid into and out of said at least one primary chamber and into and out of said at least one second auxiliary chamber, and preventing flow of said pressurized liquid into and out of said at least one first auxiliary chamber, whereby said liquid is not trapped inside said primary and second auxiliary chambers and is trapped inside said at least one first auxiliary chamber, and whereby said at least one primary cam lobe and said at least one second auxiliary cam lobe are deactivated, and said at least one first auxiliary cam lobe is activated, and (3) a third control mode allowing flow of said pressurized liquid into and out of said at least one primary chamber and into and out of said at least one first auxiliary chamber, and preventing flow of said pressurized liquid into and out of said at least one second auxiliary chamber, whereby said liquid is not trapped inside said primary and first auxiliary chambers and is trapped inside said at least one second auxiliary chamber, and whereby said at least one primary cam lobe and said at least one first auxiliary cam lobe are deactivated and said at least one second auxiliary cam lobe is activated, whereby motion of said at least one output member is determined by motion of said at least one primary input member and is not affected by motion of said at least one first auxiliary input member and said at least one second auxiliary input member when said flow control means operates in said first control mode, whereby motion of said at least one output member is determined by motion of said at least one first auxiliary input member and is not affected by motion of said at least one primary input member and said at least one second auxiliary input member when said flow control means operates in said second control mode, whereby motion of said at least one output member is determined by motion of said at least one second auxiliary input member and is not affected by motion of said at least one primary input member and said at least one first auxiliary input member when said flow control means operates in said third control mode, whereby motion of said at least one valve is determined by shape of said at least one primary cam lobe and said at least one valve operates in said primary activating mode when said flow control means operates in said first control mode, whereby motion of said at least one valve is determined by shape of said at least one first auxiliary cam lobe and said at least one valve operates in said first auxiliary activating sub-mode when said flow control means operates in said second control mode, and whereby motion of said at least one valve is determined by shape of said at least one second auxiliary cam lobe and said at least one valve operates in said second auxiliary activating sub-mode when said flow control means operates in said third control mode.

9. The method of claim 1 wherein said activator means further comprises:

(a) at least one single-input activator, each activator interposed between a cam lobe and at least one valve, said activator including:
  (1) a housing stationary relative to said engine,
  (2) at least one input member within said housing actuatable by said cam lobe,
  (3) an output means for actuating said at least one valve, said output means including at least one movable output member within said housing, and
  (4) at least one chamber filled with liquid between said at least one input member and said at least one output member, the arrangement of said at least one chamber with said at least one input member and said at least one output member being such that:
    (A) motion of said at least one input member can be transmitted to said at least one output member and motion of said at least one output member can be transmitted to said at least one input member through said liquid when said liquid is trapped inside said at least one chamber, and
    (B)) motion of said at least one input member can not be transmitted to said at least one output member and motion of said at least one output member can not be transmitted to said at least one input member through said liquid when said liquid is not trapped inside said at least one chamber, (b) a source of pressurized liquid and means for flowing said pressurized liquid through said at least one single-input activator, and (c) a flow control means for controlling flow of said pressurized liquid through said at least one single-input activator, said flow control means selectively and alternatively operating in a control mode selected from a set of control modes including:
  (1) a first control mode preventing flow of said pressurized liquid into and out of said at least one chamber, whereby said liquid is trapped inside said at least one chamber, and whereby said cam lobe is activated, and
  (2) a second control mode allowing flow of said pressurized liquid into and out of said at least one chamber, whereby said liquid is not trapped inside said at least one chamber, and whereby said cam lobe is deactivated, whereby motion of said at least one valve is determined by shape of said cam lobe when said flow control means operates in said first control mode, and whereby said at least one valve is deactivated when said flow control means operates in said second control mode.

10. The method of claim 1 wherein timing of operation of at least one of said plurality of valves is such that it opens during said volume-increasing stroke and closes during said volume-decreasing stroke.

11. The method of claim 1 wherein timing of operation of at least one of said plurality of valves is such that it opens during said volume-decreasing stroke and closes during said volume-increasing stroke.

12. The method of claim 1 further including the steps of using said control means to monitor the pressure in said air-reservoir means and controlling the timing of opening of said plurality of valves so that the pumping loss is minimized and the thermodynamic cycle efficiency is optimized.

13. The method of claim 1 further including the step of controlling the torque produced by said engine, during operation in said auxiliary operational mode, by controlling the timing of opening of said plurality of valves, whereby the volume and the mass of air received into said cylinder chamber is controlled.

14. The method of claim 1 further including the steps of:
(a) providing a pressure attenuating means for varying air pressure, and
(b) controlling the torque produced by said engine by using said pressure attenuating means to attenuate pressure of air received into said cylinder chamber,
whereby the density and the mass of air received into said cylinder chamber is controlled.

15. The method of claim 1 wherein said set of activating modes further includes a neutral activating mode in which said primary cam lobes and said auxiliary cam lobes are deactivated, whereby said valve means is deactivated.

16. A method of operating a wheeled vehicle, said method comprising the steps of:
(a) providing an engine mounted in said vehicle and coupled to at least one vehicle wheel for its propulsion and braking, said engine including:
  (1) at least one cylinder,
  (2) a cylinder chamber within said at least one cylinder,
  (3) a head mounted to said at least one cylinder, and
  (4) a piston operatively engaging said at least one cylinder, with the piston to head and cylinder relationship being such that the volume of said cylinder chamber shrinks during a volume decreasing-stroke, when said piston moves towards said head, and expands during a volume increasing-stroke, when said piston moves away from said head,
(b) providing an air-reservoir means mounted in said vehicle for receiving, storage, and discharge of compressed air,
(c) providing a control means for controlling the operation of said engine and said vehicle in response to driver's demands and in accordance with a control program incorporated in said control means,
(d) providing a gas-exchange controlling means for connecting said engine to outside atmosphere and to said air-reservoir means, said gas-exchange controlling means including a valve means for accommodating gas flow into and out of said cylinder chamber, said valve means including a plurality of valves in each engine cylinder,
(e) providing a camshaft means for selectively and alternatively operating said valve means in a mode selected from a set of modes including:
  (1) a two-stroke mode wherein said valve means opens once every crankshaft revolution, and
  (2) a four-stroke mode wherein said valve means opens once every two crankshaft revolutions,
(f) providing means for switching operation of said valve means from said two-stroke mode to said four-stroke mode and from said four-stroke mode to said two-stroke mode in accordance with a control program incorporated in said control means, whereby said engine can be selectively and alternatively operated in a two-stroke cycle and in a four-stroke cycle,
(g) providing an air-flow control means for controlling air flow into and out of said at least one cylinder, said air-flow means including a phase-shifter means for varying and setting phase relationship between said camshaft means and said engine crankshaft,
whereby timing of opening of each of said plurality of valves relative to a reference position of said piston can be varied,
whereby distance traveled by said piston during a valve opening event can be varied, whereby volume of air received into said cylinder chamber and volume of air displaced from said cylinder chamber can be varied,
whereby ratio of volume of air received into said cylinder chamber to volume of air displaced from said cylinder chamber can be varied,
whereby compression ratio of air compressed in said cylinder chamber during said volume-decreasing stroke can be varied, and
whereby expansion ratio of air expanded in said cylinder chamber during said volume-increasing stroke can be varied,
(h) selectively and alternatively operating said engine in a mode selected from a set of operational modes including a primary operational mode wherein said engine operates as a conventional internal-combustion engine, and an auxiliary operational mode, said auxiliary operational mode comprising the steps of:
  (1) operating said engine as a compressor driven by vehicle momentum during said vehicle braking, said compressor receiving air from outside atmosphere, compressing said air and displacing it into said air-reservoir means for storage therein, and
  (2) operating said engine as a prime mover during said vehicle propulsion, said prime mover receiving compressed air from said air-reservoir means and using energy of said compressed air for vehicle propulsion, and
(i) varying timing of opening of said plurality of valves relative to a reference position of said piston in accordance with said control program incorporated in said control means, whereby air compression and air expansion in said cylinder chamber are controlled as required to satisfy driver's demands and in accordance with said control program.

17. The method of claim 1 further including the steps of using said control means to monitor the pressure in said air-reservoir means and controlling the timing of opening of said plurality of valves so that the pumping loss is minimized and the thermodynamic cycle efficiency is optimized.

18. The method of claim 1 further including the step of controlling the torque produced by said engine, during operation in said auxiliary operational mode, by controlling the timing of opening of said plurality of valves, whereby the volume and the mass of air received into said cylinder chamber is controlled.

19. A system for operating a wheeled vehicle, said system comprising:
(a) an engine mounted in said vehicle and coupled to at least one vehicle wheel for its propulsion and braking, said engine including:
  (1) at least one cylinder,
  (2) a cylinder chamber within said at least one cylinder,
  (3) a head mounted to said at least one cylinder, and
  (4) a piston operatively engaging said at least one cylinder, with the piston to head and cylinder relationship being such that the volume of said cylinder chamber shrinks during a volume decreasing-stroke, when said piston moves towards said head, and expands during a volume increasing-stroke, when said piston moves away from said head,
(b) an air-reservoir means mounted in said vehicle for receiving, storage, and discharge of compressed air,
(c) a control means for controlling the operation of said engine and said vehicle in response to driver's demands and in accordance with a control program incorporated in said control means,
(d) a gas-exchange controlling means for connecting said engine to outside atmosphere and to said air-reservoir means, said gas-exchange controlling means including a valve means for accommodating gas flow into and out of said cylinder chamber, said valve means including a plurality of valves in each engine cylinder, (e) a camshaft means for operating said valve means, said camshaft means comprising a plurality of cam lobes including a set of primary cam lobes and a set of auxiliary cam lobes, (f) an activator means for selectively and alternatively activating and deactivating cam lobes selected from said plurality of cam lobes, and for selectively and alternatively setting operation of said valve means into a mode selected from a set of activating modes including:
 (1) a primary activating mode in which only primary cam lobes are activated, whereby only said primary cam lobes operate said valve means, and
 (2) an auxiliary activating mode in which only selected auxiliary cam lobes are activated, whereby only said selected auxiliary cam lobes operate said valve means, said activator means comprising a plurality of activators, (g) a phase-shifter means for varying and setting phase relationship between said camshaft means and said engine crankshaft,
 whereby timing of opening of each of said plurality of valves relative to a reference position of said piston can be varied,
 whereby distance traveled by said piston during a valve opening event can be varied,
 whereby volume of air received into said cylinder chamber and volume of air displaced from said cylinder chamber can be varied,
 whereby ratio of volume of air received into said cylinder chamber to volume of air displaced from said cylinder chamber can be varied,
 whereby compression ratio of air compressed in said cylinder chamber during said volume-decreasing stroke can be varied, and
 whereby expansion ratio of air expanded in said cylinder chamber during said volume-increasing stroke can be varied.

20. The system of claim 19 wherein said camshaft means comprises at least one compound cam lobe, each compound cam lobe operating an activator and each including at least one primary cam lobe and at least one auxiliary cam lobe.

21. The system of claim 20 wherein the shape of said primary cam lobe is such that it opens an engine valve once during each camshaft revolution when operated in said primary activating mode, and the shape of said auxiliary cam lobe is such that it opens said engine valve at least twice during each camshaft revolution when operated in said auxiliary activating mode, whereby said engine can selectively and alternatively operate in a four-stroke cycle and in a two-stroke cycle.

22. The system of claim 20 wherein said activator means comprises:
(a) at least one double-input activator, each activator interposed between said compound cam lobe and at least one valve, said activator including:
 (1) a housing stationary relative to said engine,
 (2) a plurality of movable input members within said housing, said plurality of movable input members including at least one primary input member actuatable by said at least one primary cam lobe, and at least one auxiliary input member actuatable by said at least one auxiliary cam lobe,
 (3) an output means for actuating said at least one valve, said output means including at least one movable output member within said housing,
 (4) at least one primary chamber filled with liquid between said at least one primary input member and said at least one output member, the arrangement of said at least one primary chamber with said at least one primary input member and said at least one output member being such that:
  (A) motion of said at least one primary input member can be transmitted to said at least one output member and motion of said at least one output member can be transmitted to said at least one primary input member through said liquid when said liquid is trapped inside said at least one primary chamber, and
  (B)) motion of said at least one primary input member can not be transmitted to said at least one output member and motion of said at least one output member can not be transmitted to said at least one primary input member through said liquid when said liquid is not trapped inside said at least one primary chamber,
 and
 (5) at least one auxiliary chamber filled with liquid between said at least one auxiliary input member and said at least one output member, the arrangement of said at least one auxiliary chamber with said at least one auxiliary input member and said at least one output member being such that:
  (A) motion of said at least one auxiliary input member can be transmitted to said at least one output member and motion of said at least one output member can be transmitted to said at least one auxiliary input member through said liquid when said liquid is trapped inside said at least one auxiliary chamber, and
  (B)) motion of said at least one auxiliary input member can not be transmitted to said at least one output member and motion of said at least one output member can not be transmitted to said at least one auxiliary input member through said liquid when said liquid is not trapped inside said at least one auxiliary chamber,
(b) a source of pressurized liquid and means for flowing said pressurized liquid through said at least one double-input activator, and
(c) a flow control means for controlling flow of said pressurized liquid through said at least one double-input activator, said flow control means selectively and alternatively operating in a control mode selected from a set of control modes including:
 (1) a first control mode allowing flow of said pressurized liquid into and out of said at least one auxiliary chamber and preventing flow of said pressurized liquid into and out of said at least one primary chamber, whereby said liquid is not trapped inside said at least one auxiliary chamber and is trapped inside said at least one primary chamber, and whereby said at least one auxiliary cam lobe is deactivated and said at least one primary cam lobe is activated, and
 (2) a second control mode allowing flow of said pressurized liquid into and out of said at least one primary chamber and preventing flow of said pressurized liquid into and out of said at least one auxiliary chamber, whereby said liquid is not trapped inside said at least one primary chamber and is trapped inside said at least one auxiliary chamber, and whereby said at least one primary cam lobe is deactivated and said at least one auxiliary cam lobe is activated, whereby motion of said at least one output member is determined by motion of said at least one primary input member and is not affected by motion of said at least one auxiliary input member when said flow control means operates in said first control mode, whereby motion of said at least one output member is determined by motion of said at least one auxiliary input member and is not affected by motion of said at least one primary input member when said flow control means operates in said second control mode, whereby motion of said at least one valve is determined by shape of said at least one primary cam lobe and said at least one valve operates in said primary activating mode when said flow control means operates in said first control mode, and whereby motion of said at least one valve is determined by shape of said at least one auxiliary cam lobe and said at least one valve operates in said auxiliary activating mode when said flow control means operates in said second control mode.

* * * * *